United States Patent
Carter et al.

(10) Patent No.: US 7,192,634 B2
(45) Date of Patent: Mar. 20, 2007

(54) FLEXIBLE POLYMER ELEMENT AS TOUGHENING AGENT IN PREPREGS

(75) Inventors: Jeffrey Thomas Carter, Middlesbrough (GB); Carmelo Lo Faro, San Giovanni La Punta (IT); Robin Kelvin Maskell, Phoenix, AZ (US); Patrick Terence McGrail, Saltburn-by-the-Sea (GB)

(73) Assignee: Cytec Technology Corp., Wilmington, DE (US)

( * ) Notice: Subject to any disclaimer, the term of this patent is extended or adjusted under 35 U.S.C. 154(b) by 539 days.

(21) Appl. No.: 10/362,779

(22) PCT Filed: Aug. 16, 2001

(86) PCT No.: PCT/GB01/03655

§ 371 (c)(1),
(2), (4) Date: Aug. 1, 2003

(87) PCT Pub. No.: WO02/16481

PCT Pub. Date: Feb. 28, 2002

(65) Prior Publication Data

US 2004/0041128 A1    Mar. 4, 2004

(30) Foreign Application Priority Data

Aug. 22, 2000 (GB) ................... 0020630.0

(51) Int. Cl.
*C08J 5/24* (2006.01)
*C08J 5/04* (2006.01)

(52) U.S. Cl. ............... 428/113; 428/295.1; 428/397.4; 428/299.1; 252/511

(58) Field of Classification Search ............... 252/511; 525/523; 524/495; 428/113, 295.1, 297.4, 428/299.1; 264/480, 494, 105, 136, 236

See application file for complete search history.

(56) References Cited

U.S. PATENT DOCUMENTS

| 4,931,345 A | | 6/1990 | Bottger et al. ............... 428/116 |
|---|---|---|---|
| 5,057,353 A | | 10/1991 | Maranci et al. ............. 428/147 |
| 5,221,391 A | | 6/1993 | Kittaka et al. ............... 156/171 |
| 5,231,150 A | * | 7/1993 | McGrail et al. ............ 525/503 |
| 5,288,547 A | * | 2/1994 | Elmes et al. .............. 428/308.4 |
| 5,364,914 A | * | 11/1994 | Choate et al. ............... 525/505 |
| 6,060,147 A | | 5/2000 | Kim et al. ................... 428/113 |

FOREIGN PATENT DOCUMENTS

| EP | 0 323 641 B1 | 7/1989 |
|---|---|---|
| EP | 0 327 142 B1 | 8/1989 |

* cited by examiner

*Primary Examiner*—Mark Kopec
(74) *Attorney, Agent, or Firm*—Robert R. Neller

(57) ABSTRACT

A flexible polymer element for a curable composition wherein the flexible polymer element is in solid phase and adapted to undergo at least partial phase transition to fluid phase on contact with a component of the curable composition in which it is soluble at a temperature which is less than the temperature for substantial onset of gelling and/or curing of the curable composition; a method for the preparation thereof, a support structure or carrier for a curable composition comprising the at least one flexible polymer element together with reinforcing fibers, configurations of support structures and carriers, methods for preparation thereof, a curable composition comprising the at least one flexible polymer element or the support structure or carrier and a curable resin matrix, a kit of parts comprising the components thereof and a method for selection thereof, a method for preparation and curing thereof, and a cured composite or resin body obtained thereby, and known and novel uses thereof.

21 Claims, 31 Drawing Sheets

Figure B1 Dissolution of Fibre and Phase Separation
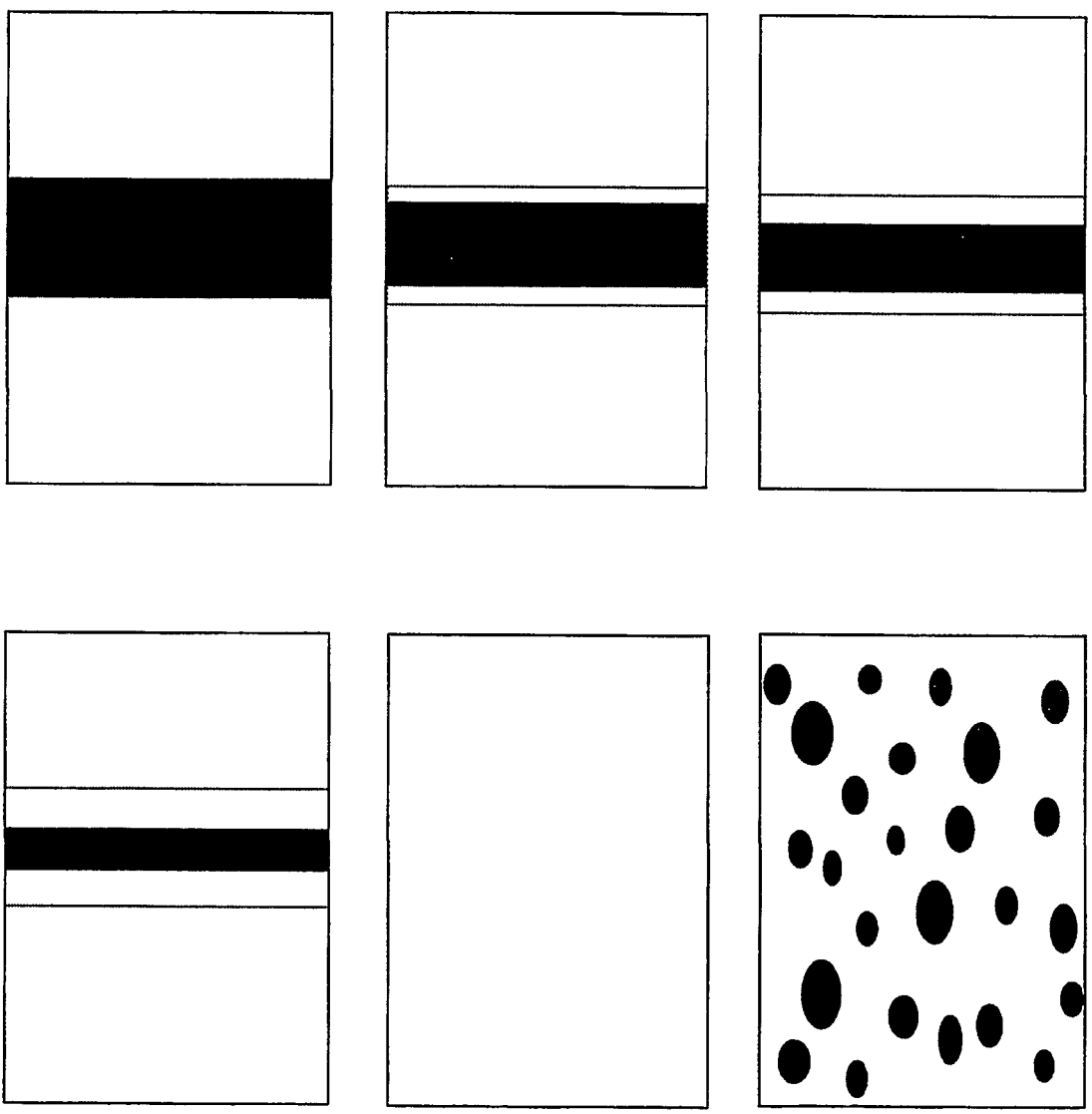

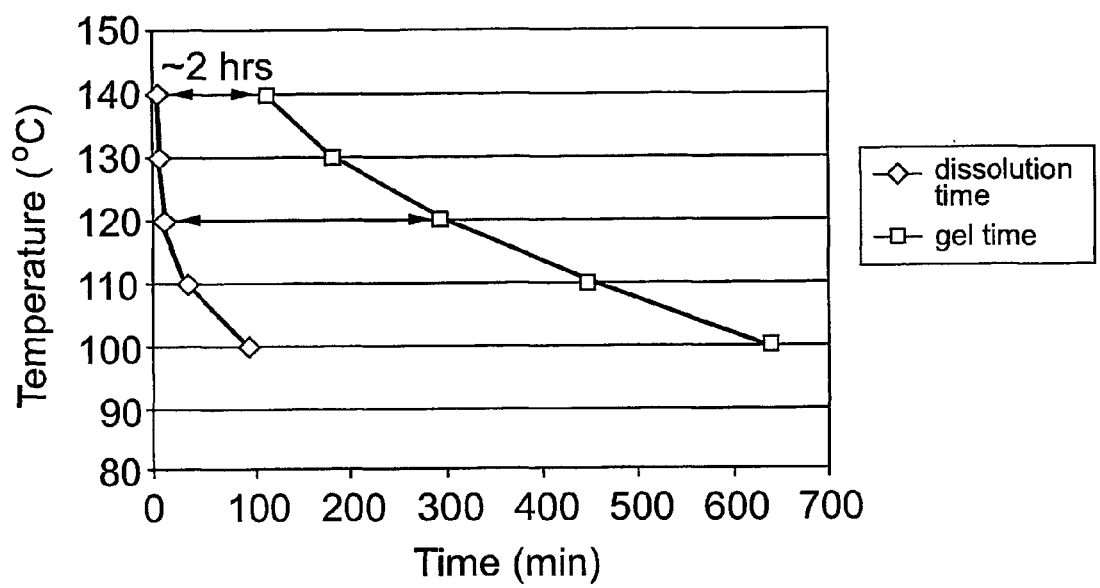
Fig. B1a

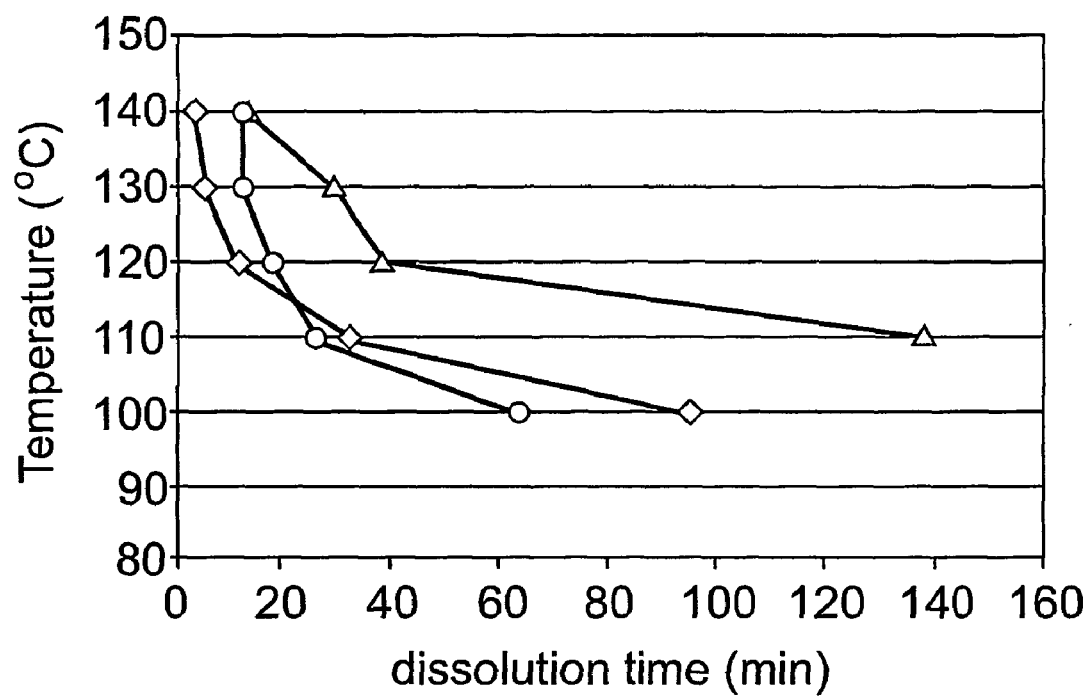
Fig. B1b

Figure B2a
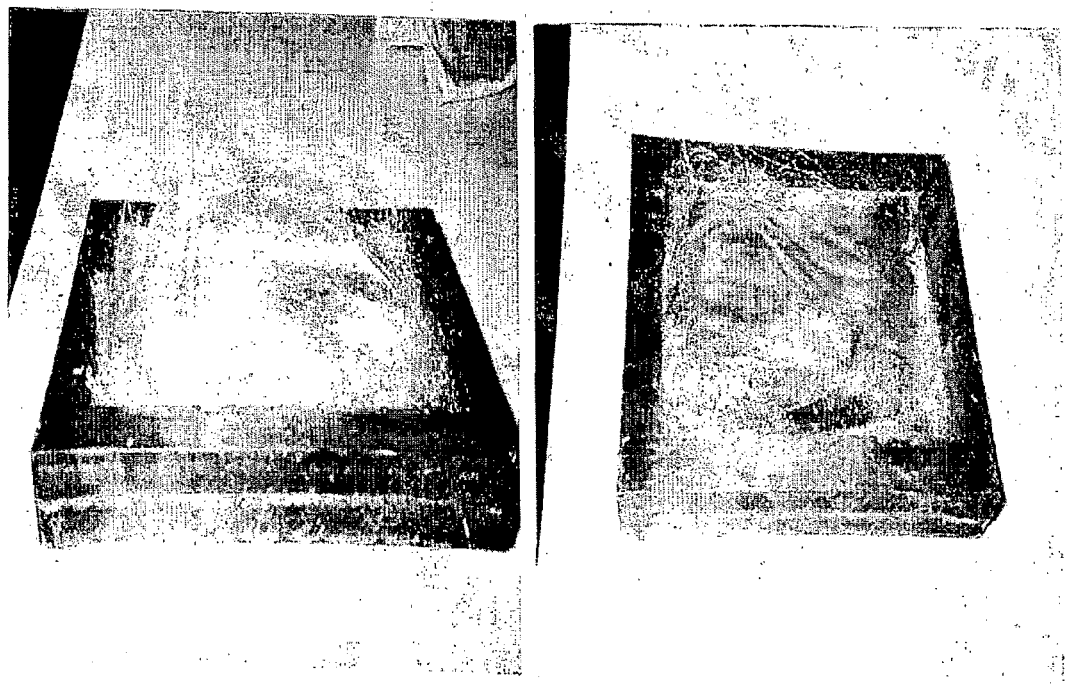

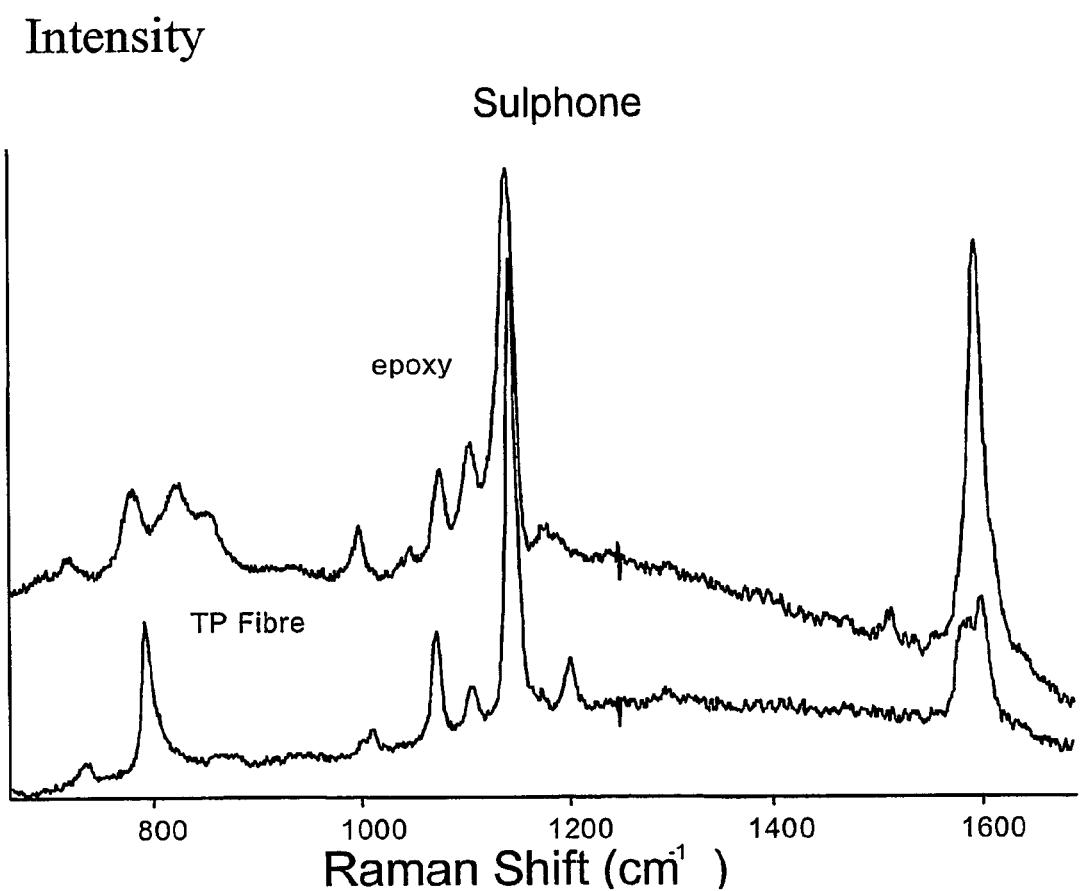
Figure B2b

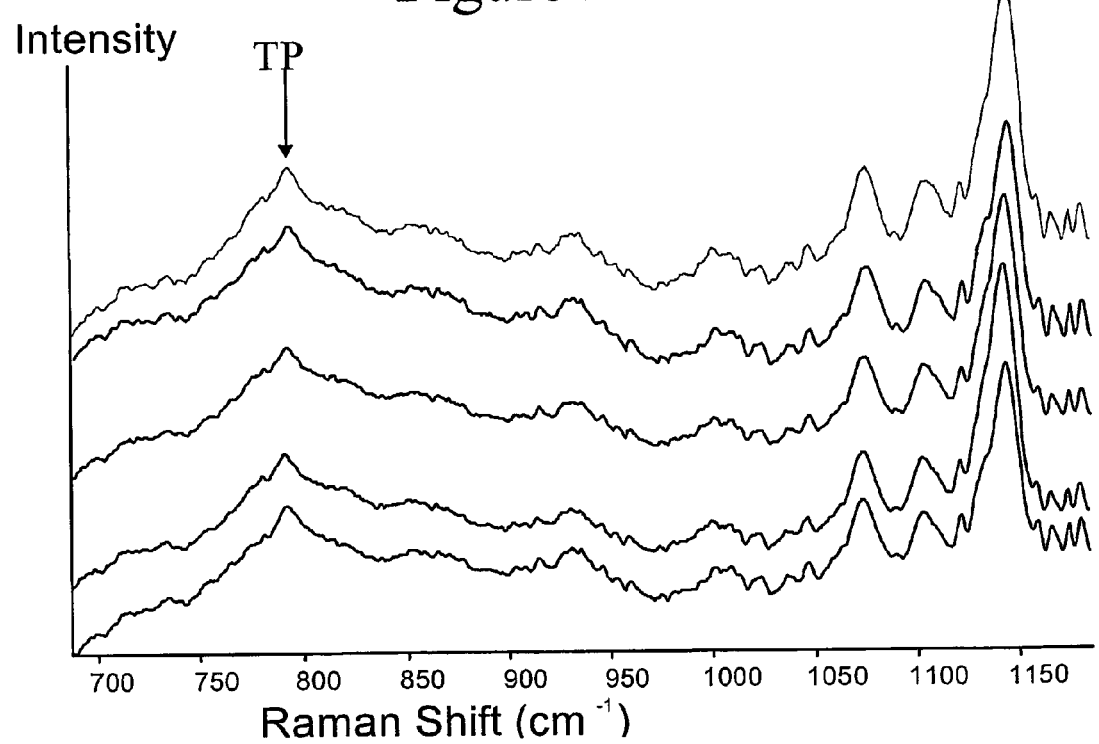

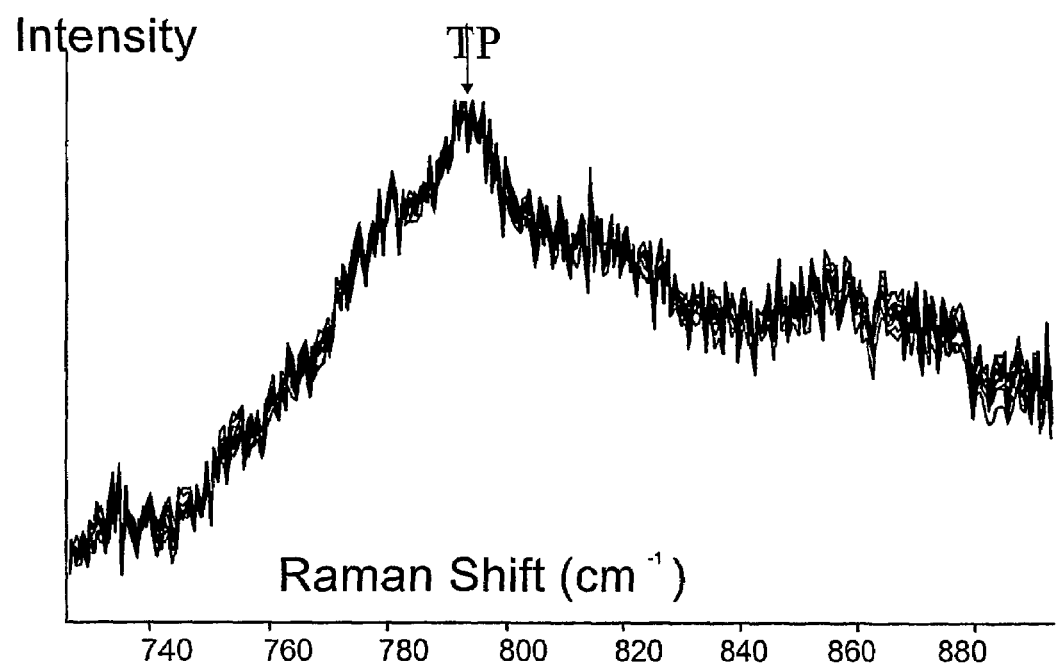
Figure B2d

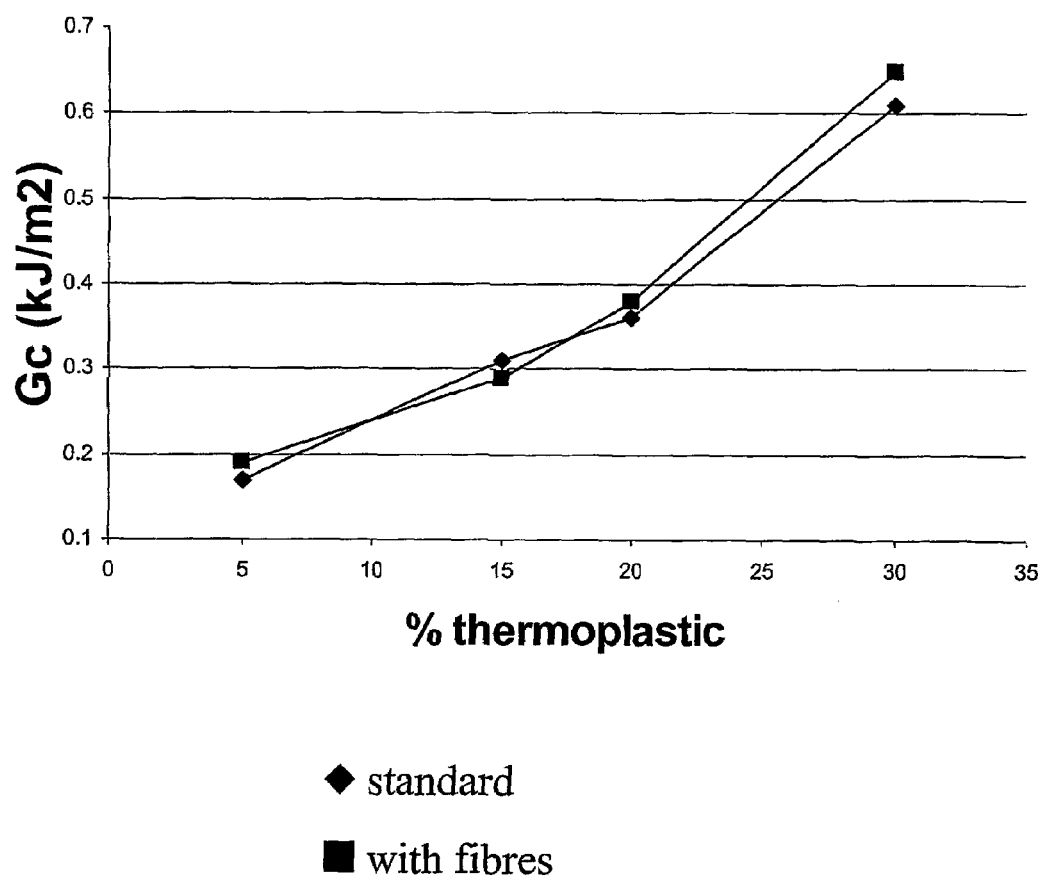
Figure B3a

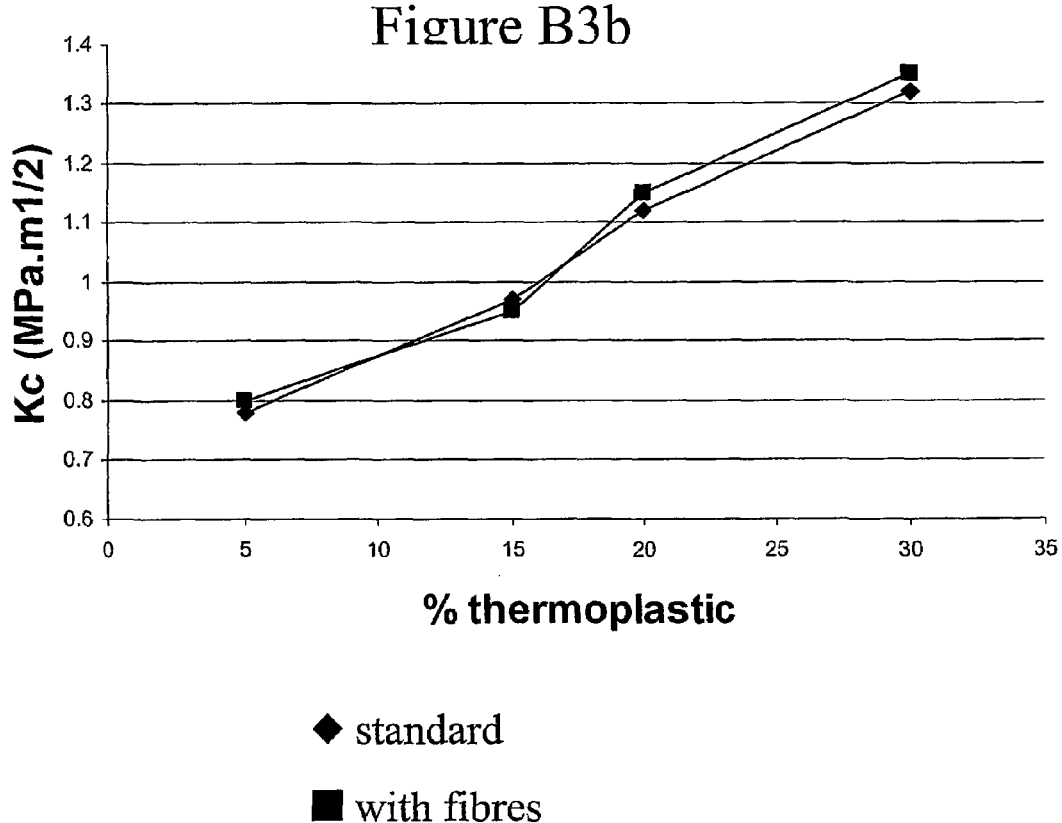

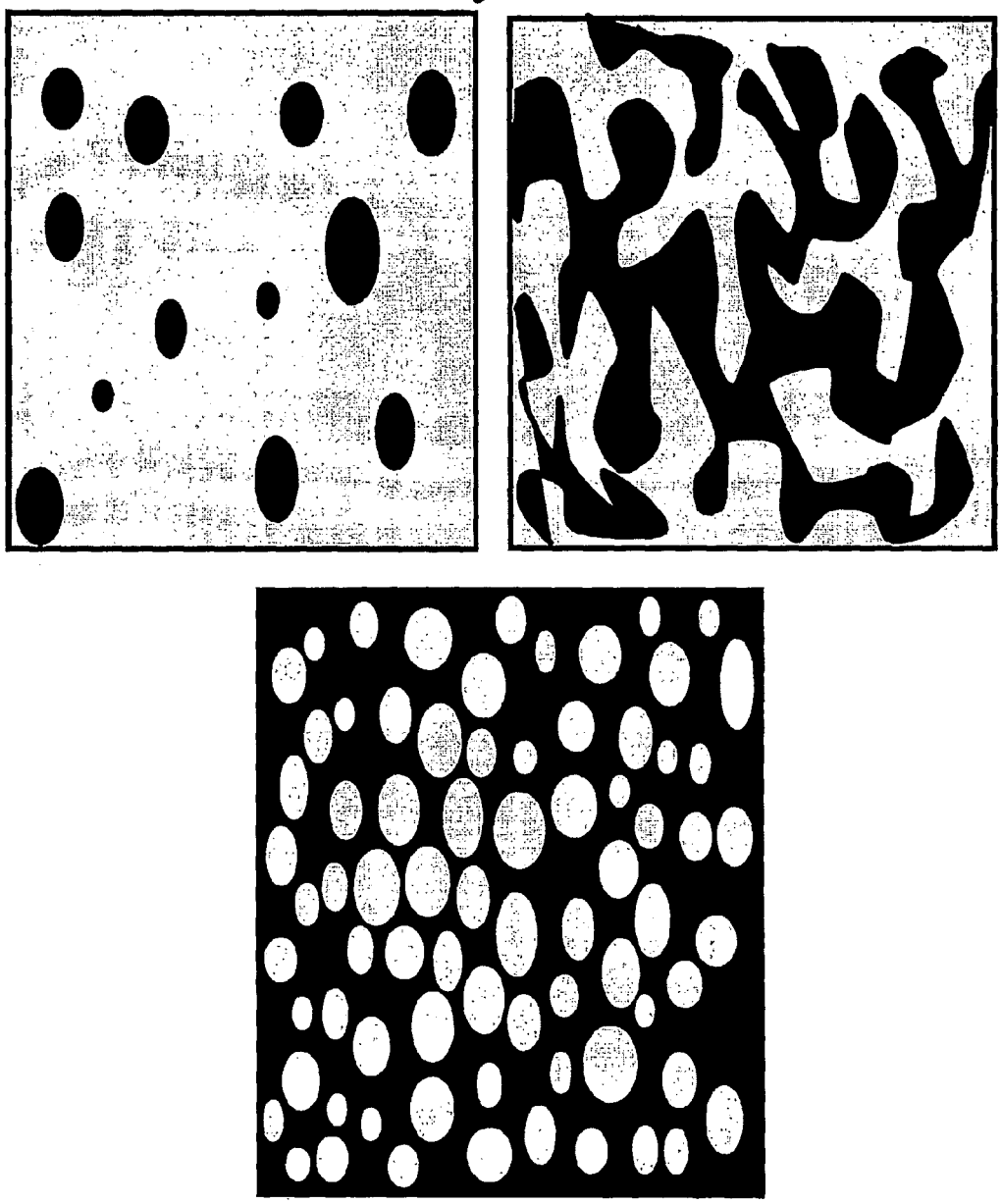
Figure B4 Typical Two Phase Morphologies in a Thermoplast/Thermoset System

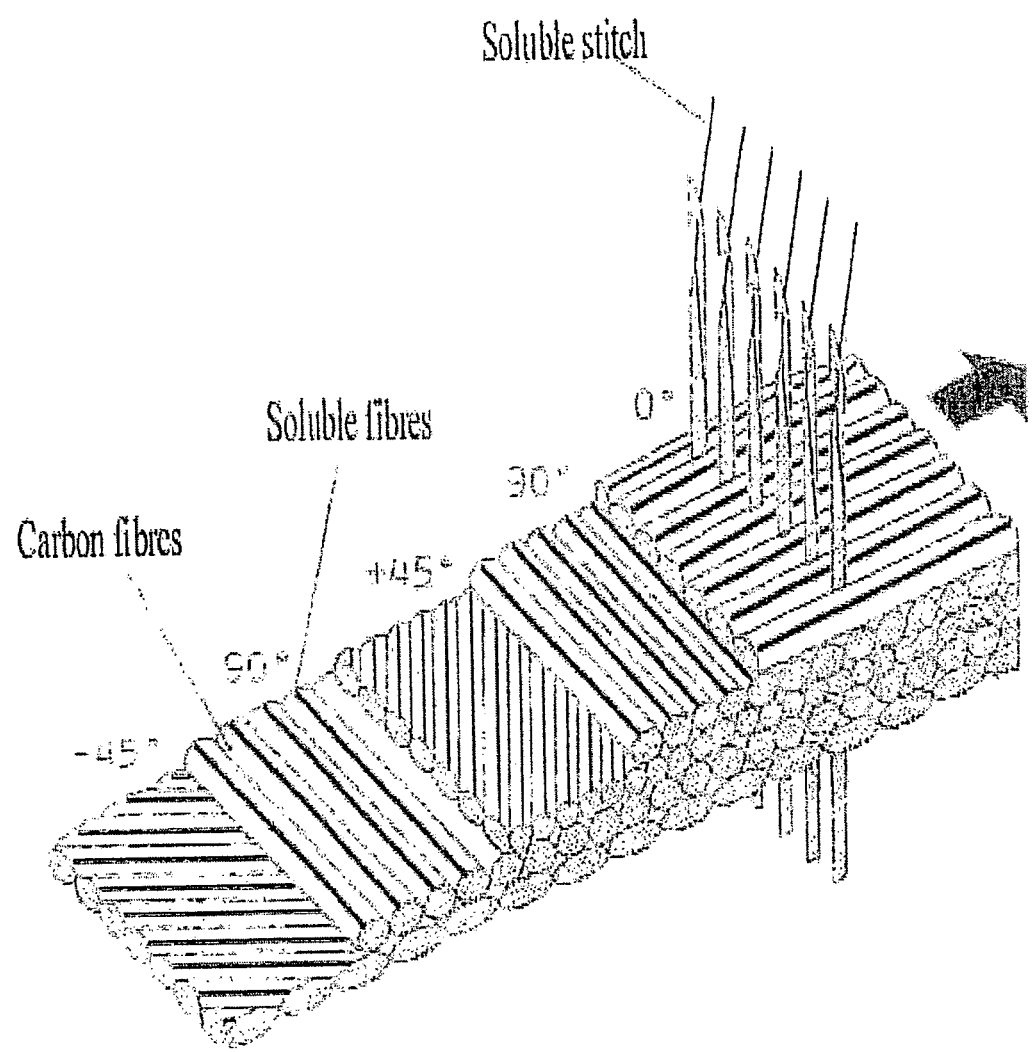
Figure D1

Figure D2
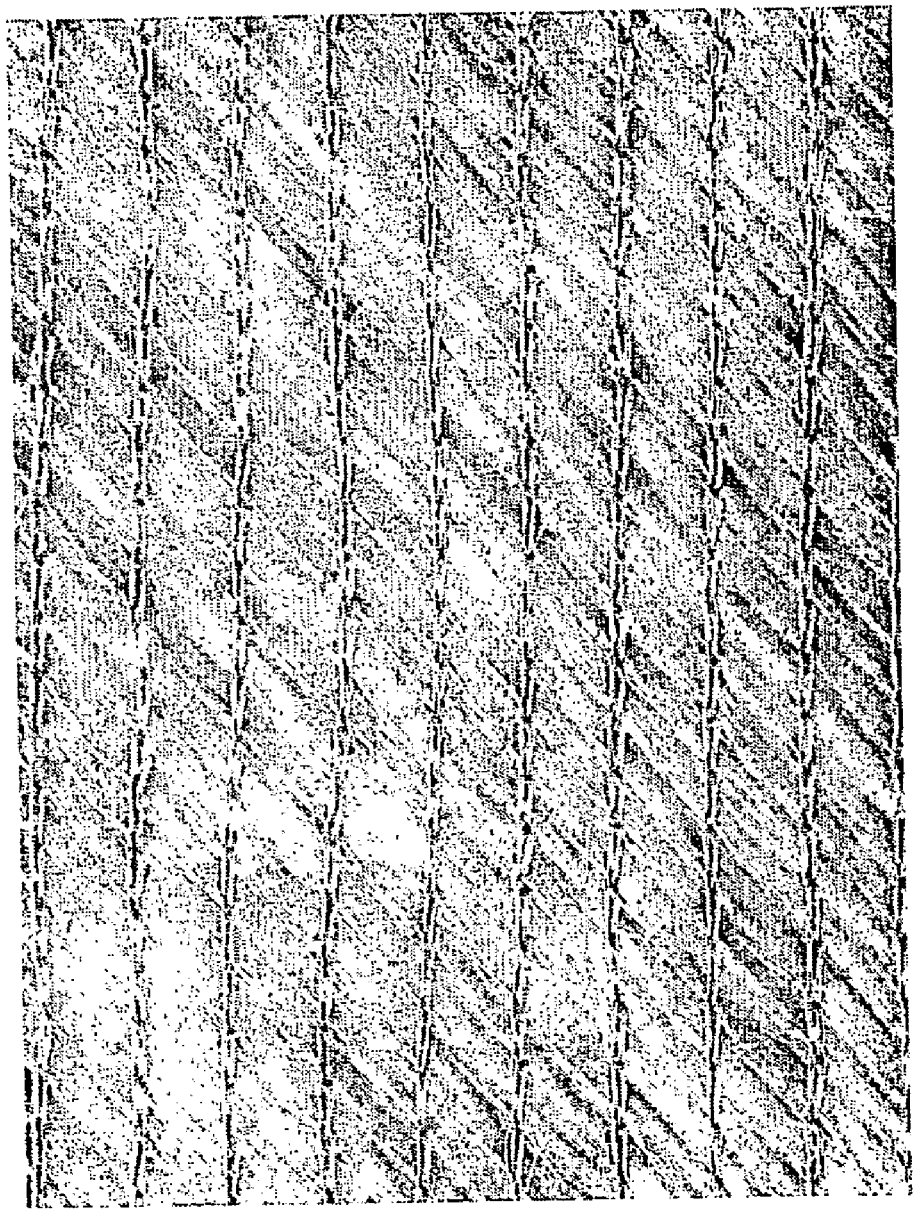

Figure D3
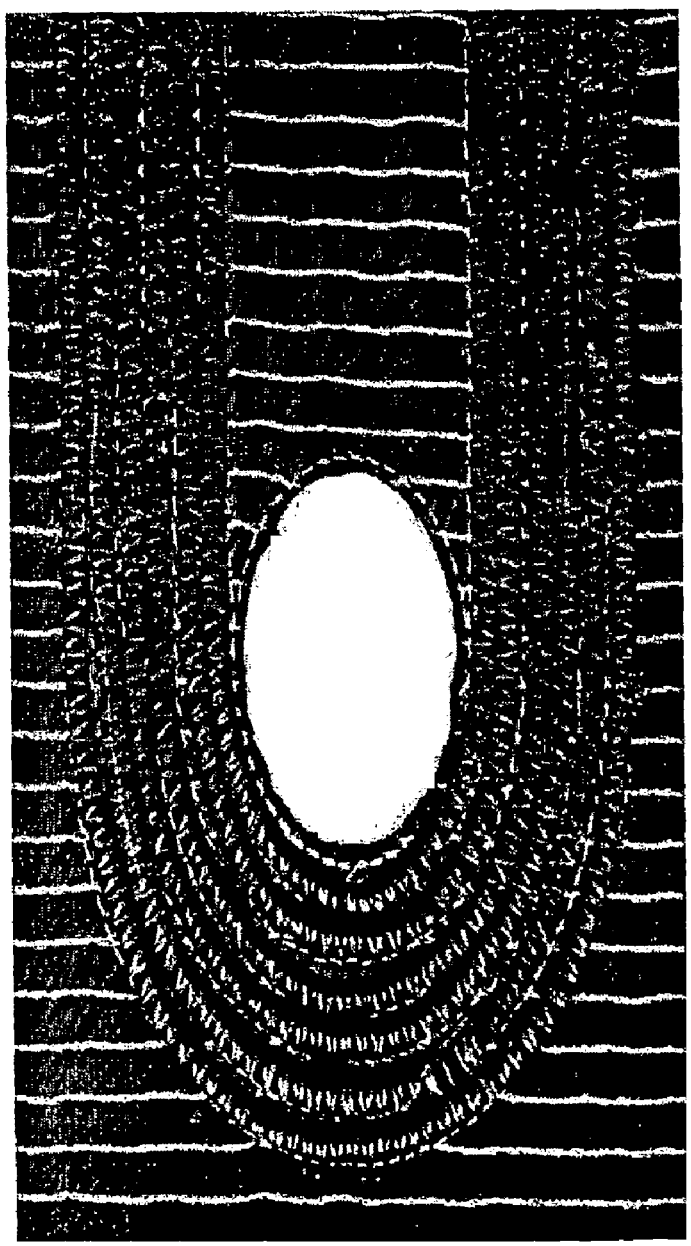

Figure D4
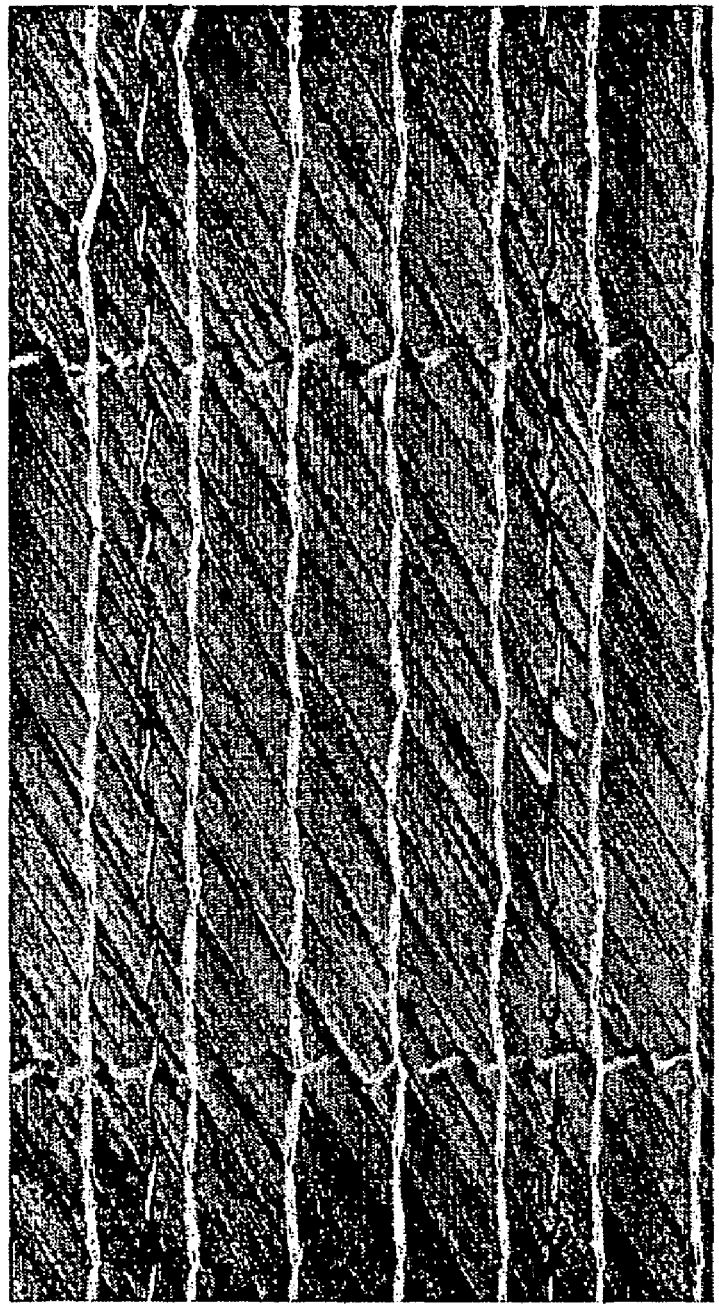

Figure D5
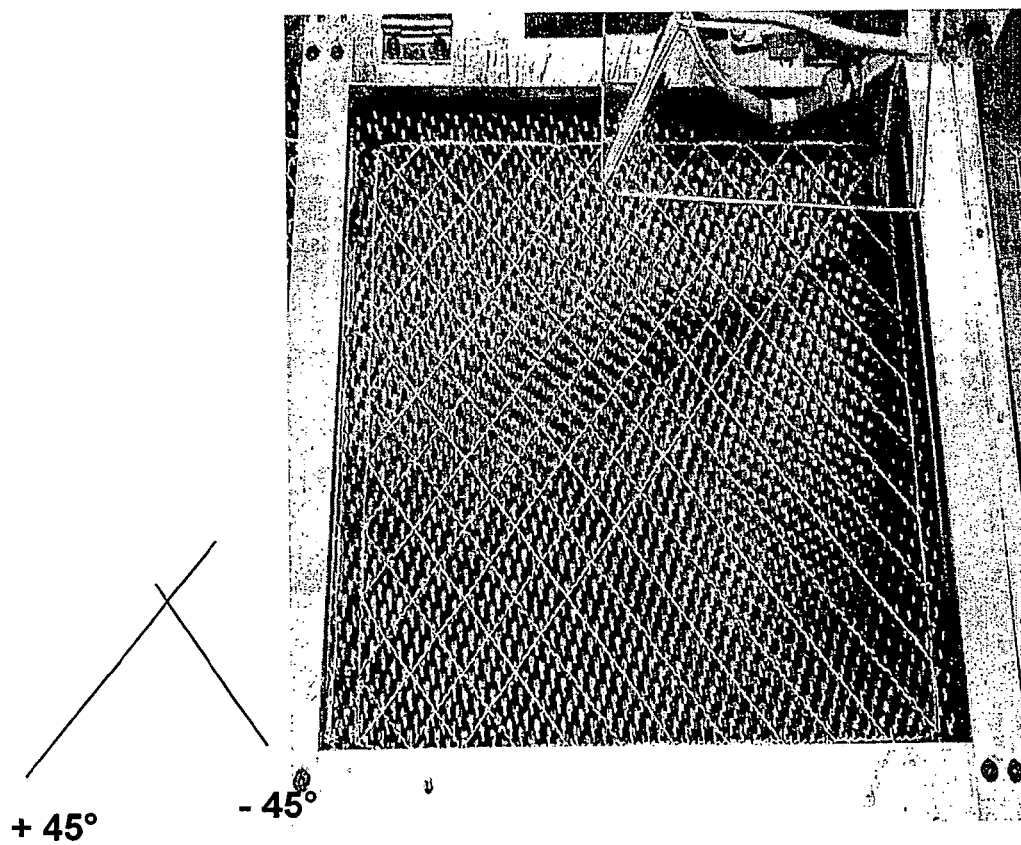

Figure D6
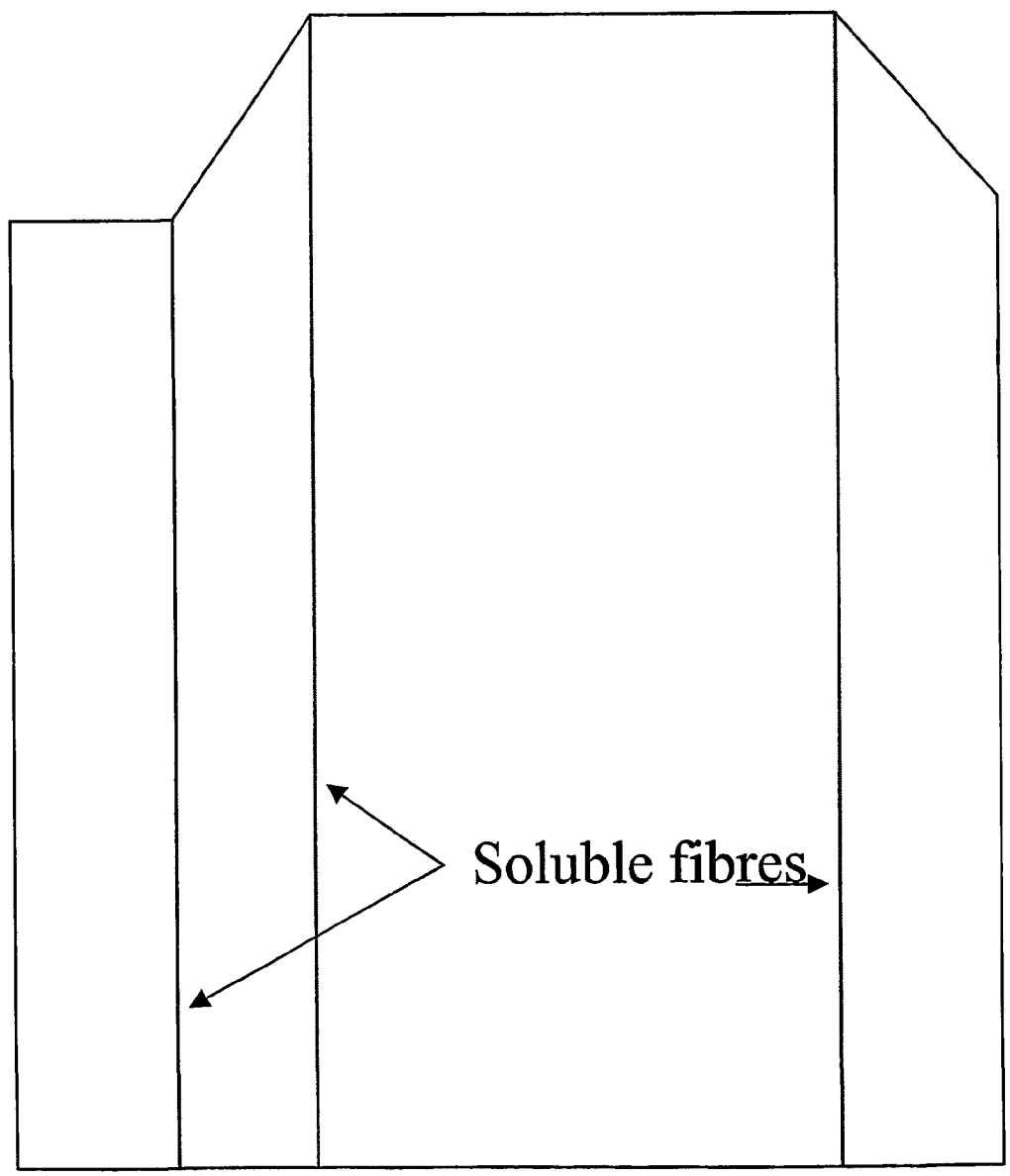

Figure D7a - Soluble fibre yarn in hybrid fabric
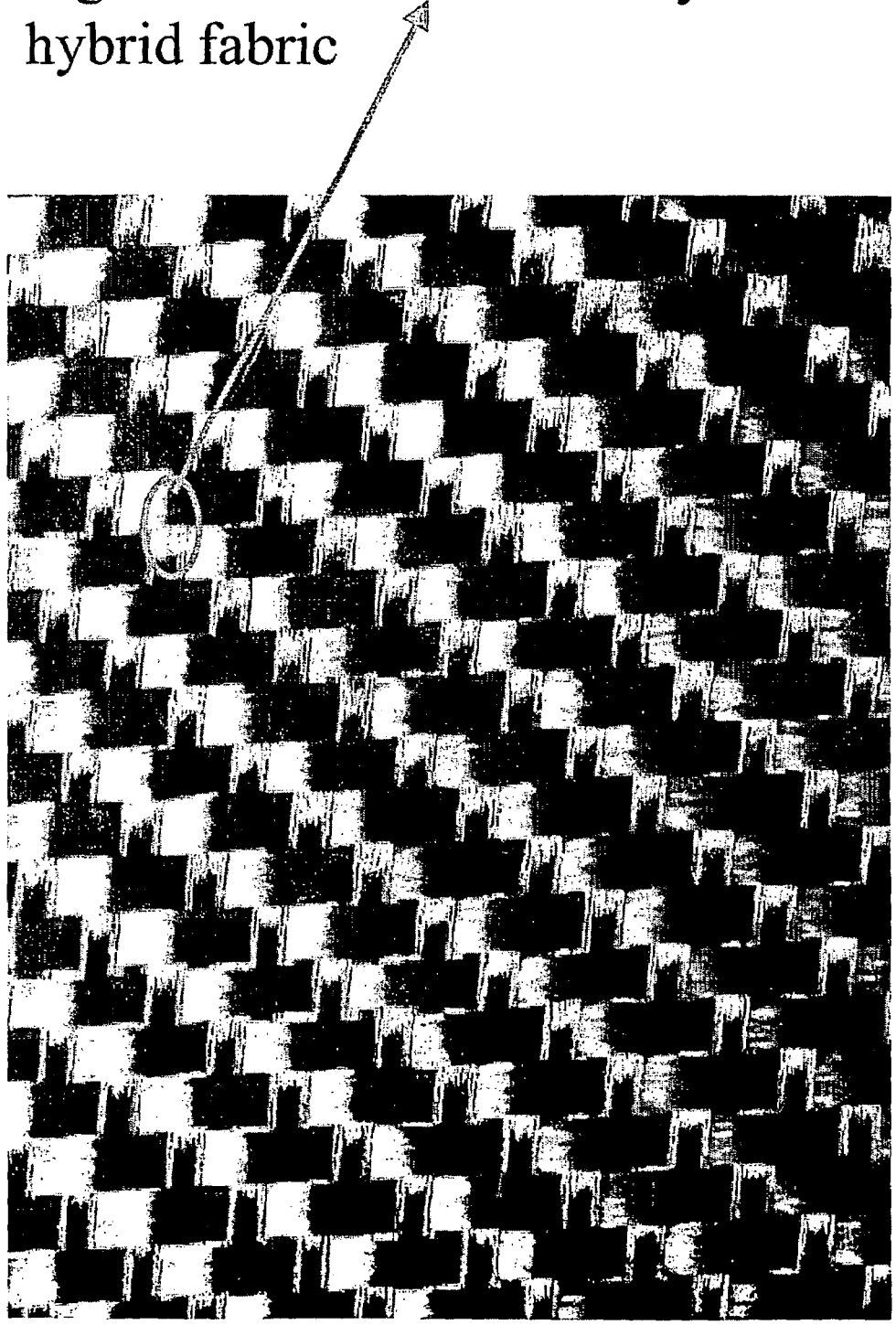

Figure D7b soluble fibre yarn in hybrid fabric
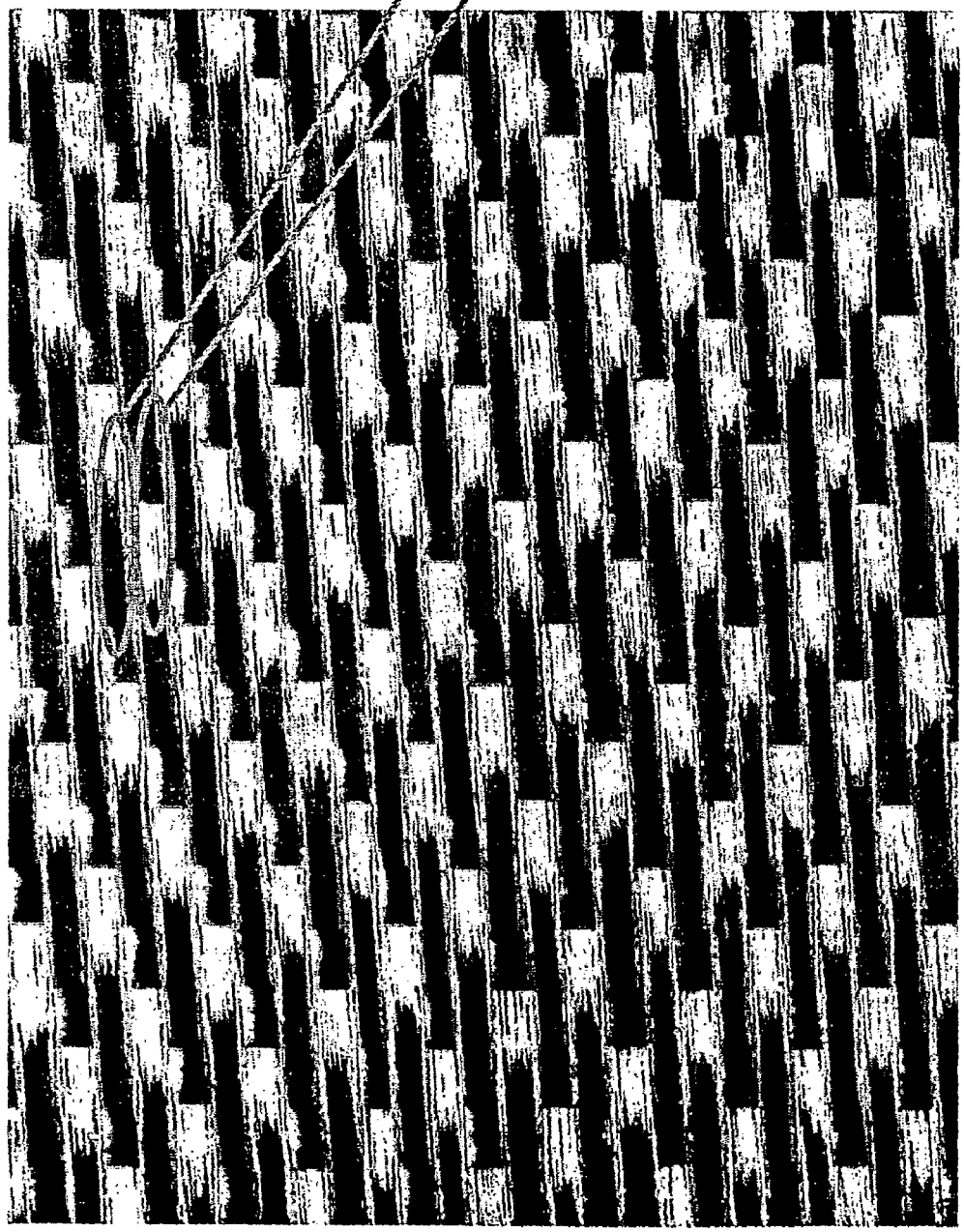

Figure D7c soluble fibre yarn in hybrid fabric
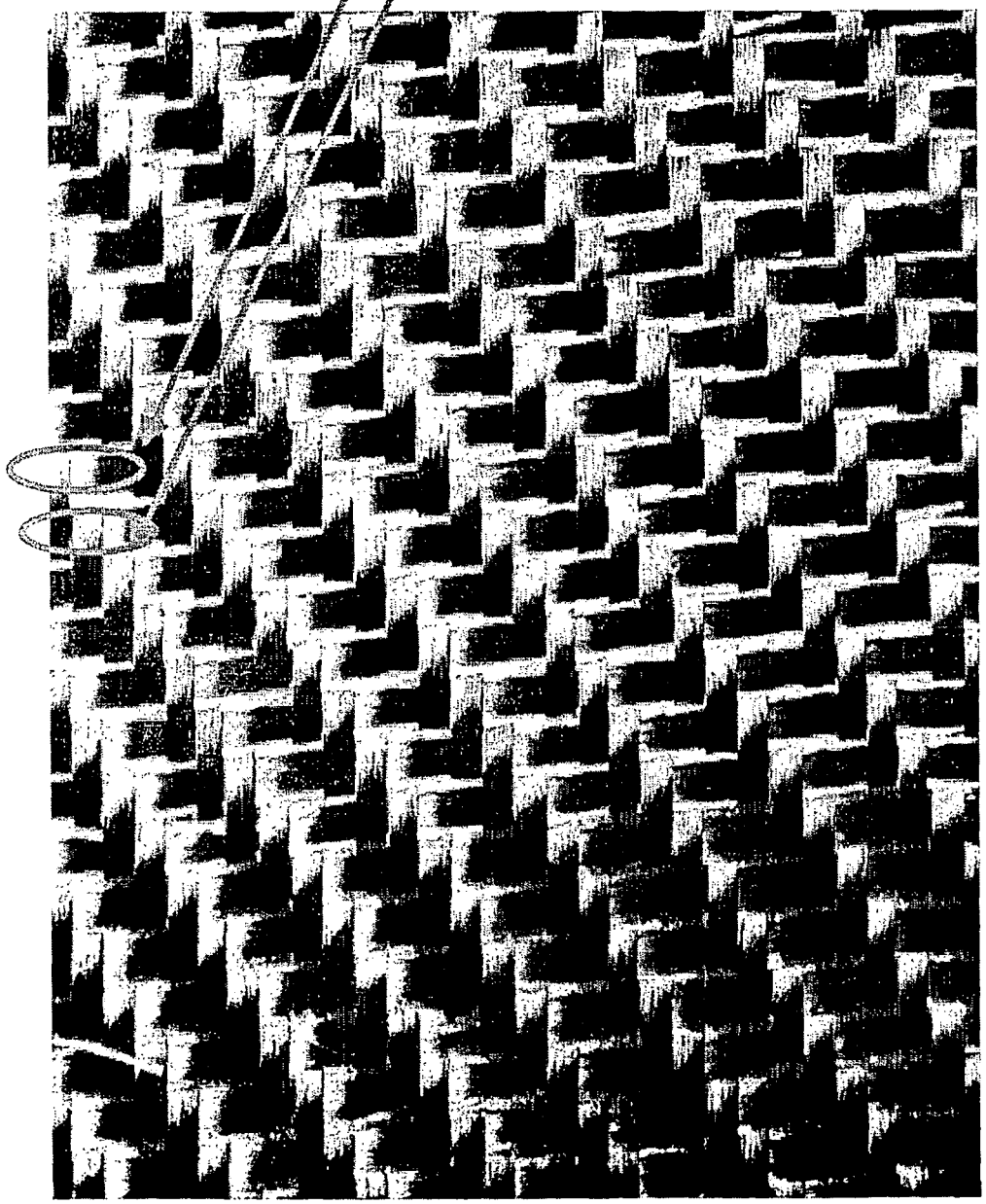

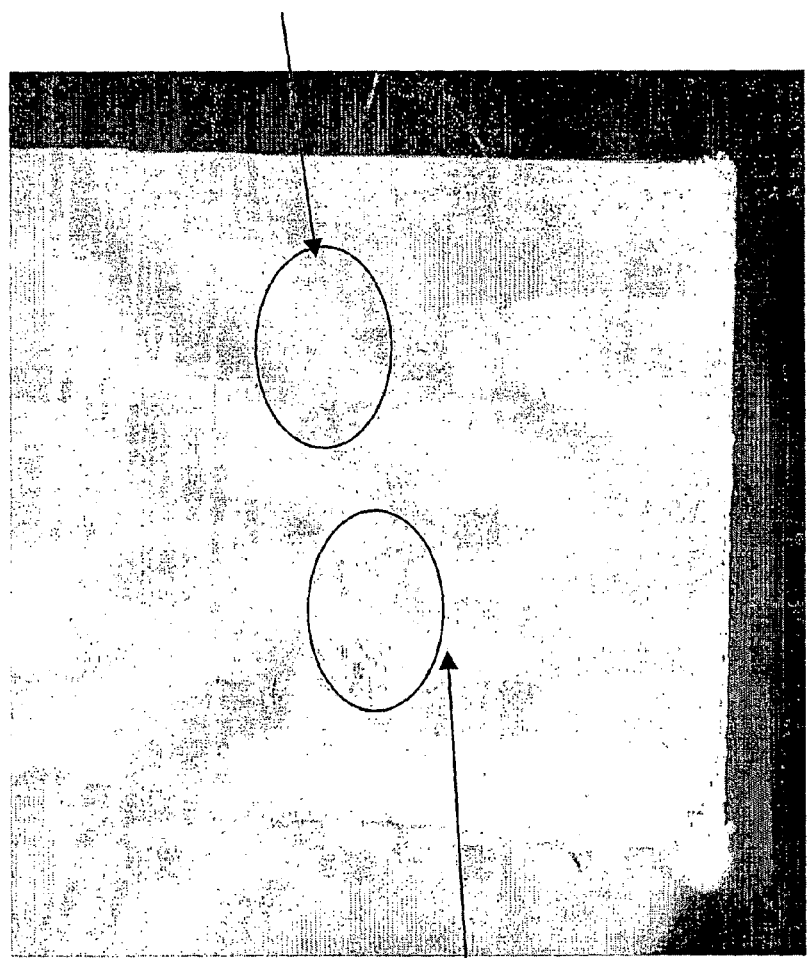
Figure E1a - Soluble stitching in non crimp fabrics

Polyester insoluble fibres
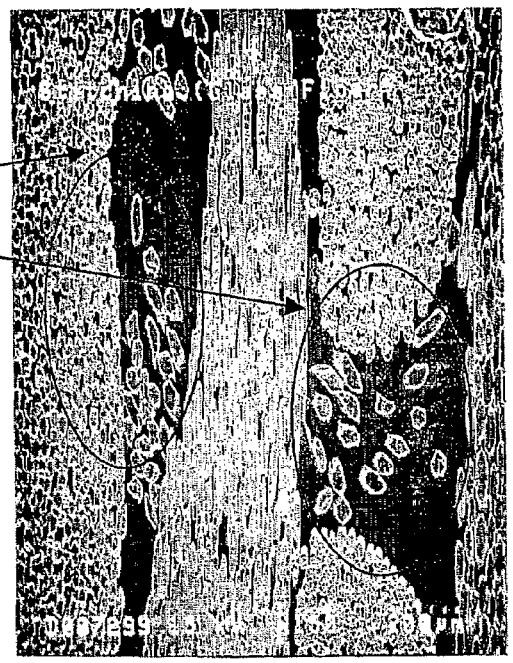
Figure E1b
Location of Soluble fibre
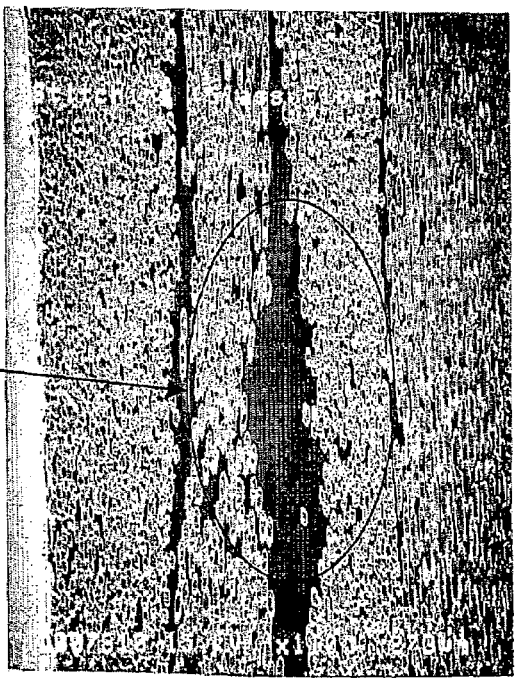

Figure E1c
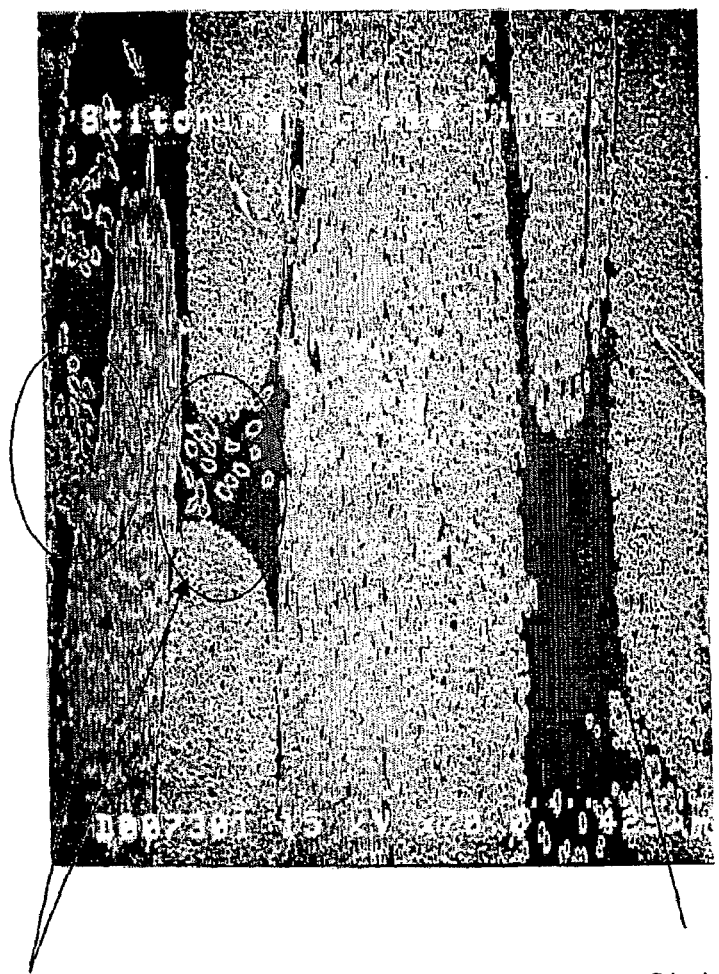
INSOLUBLE POLYESTER FIBRES
LOCATION OF SOLUBLE FIBRE

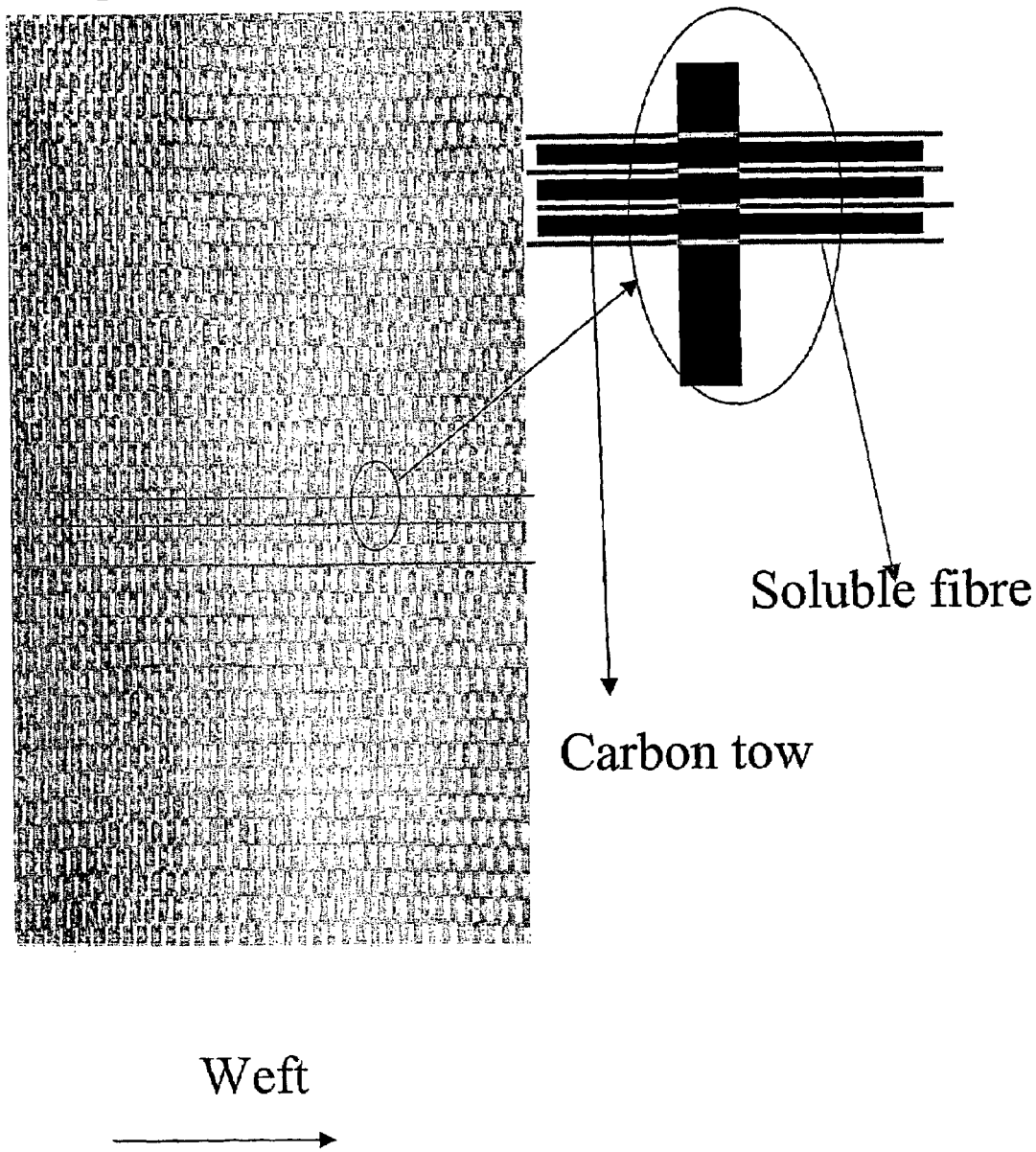
Figure E2a

Figure E2b
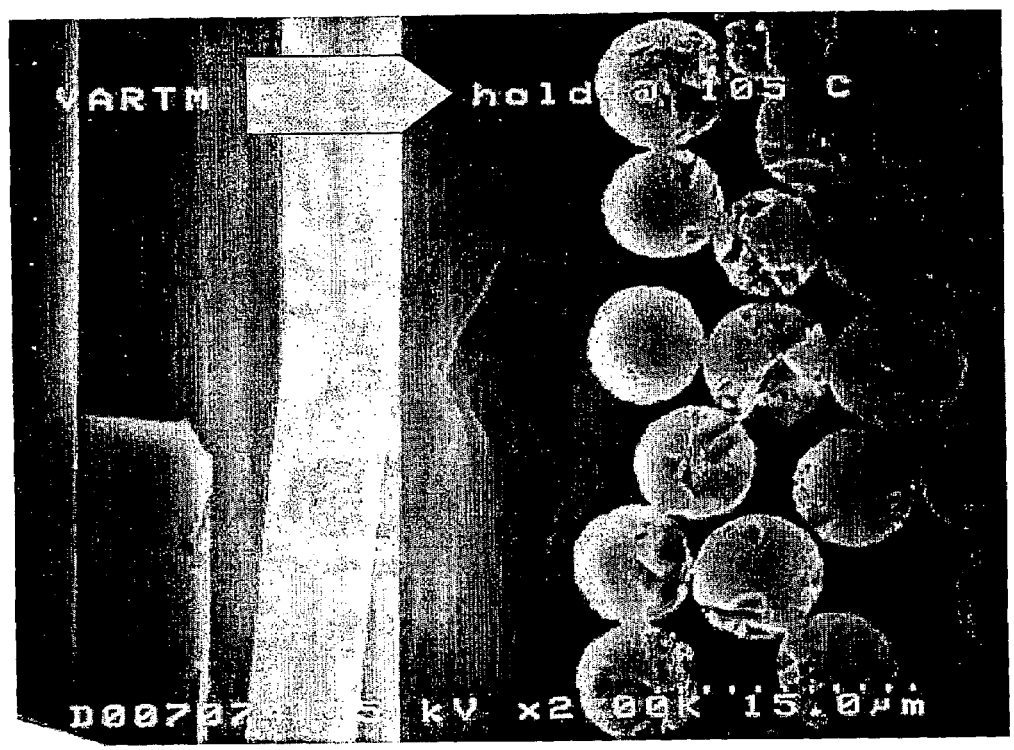

Figure E2c
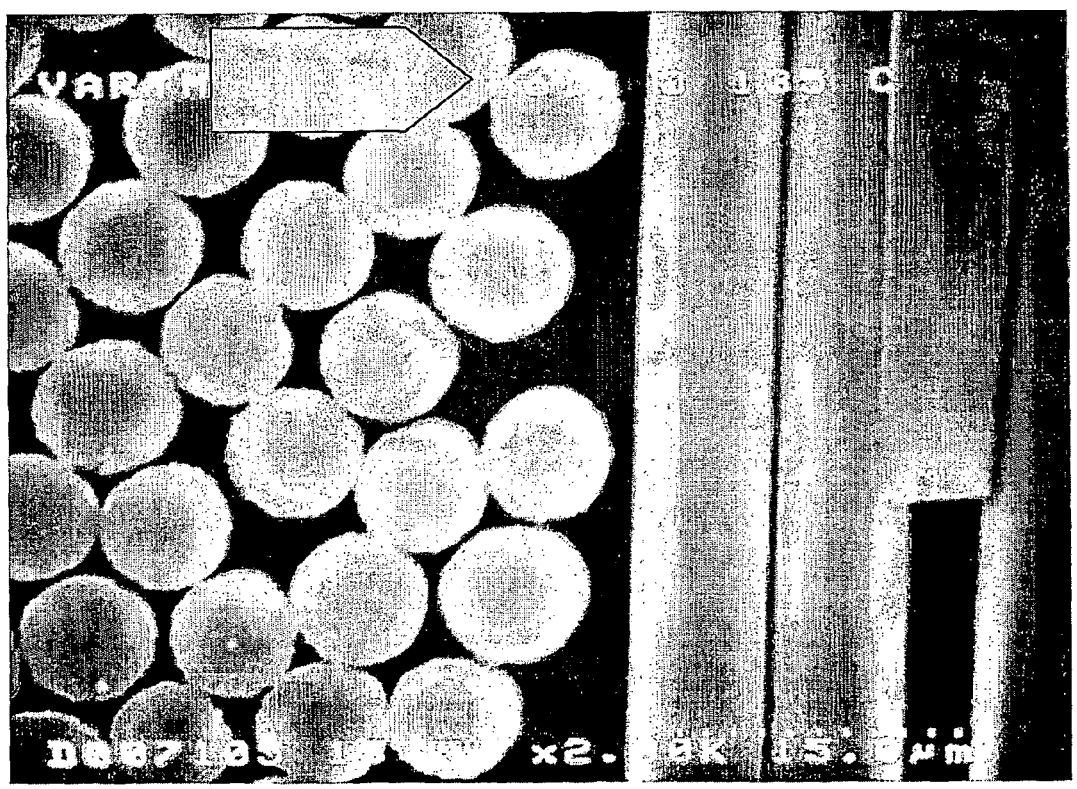

Figure F2
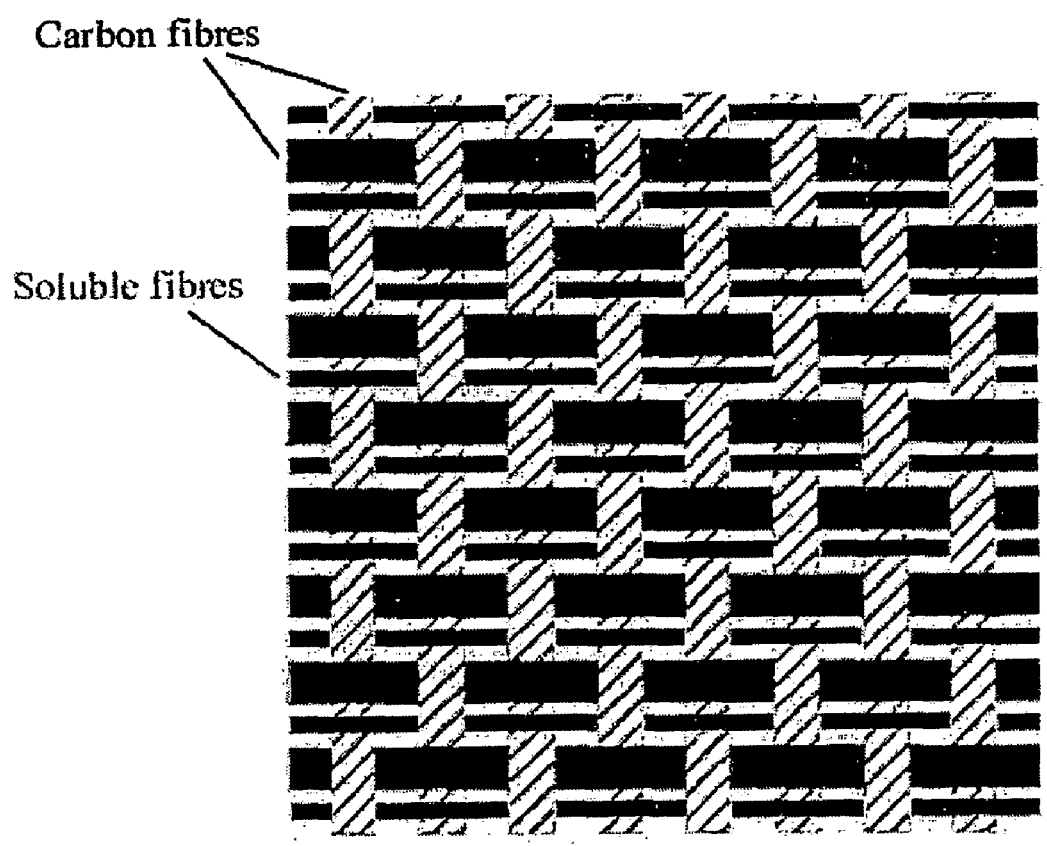

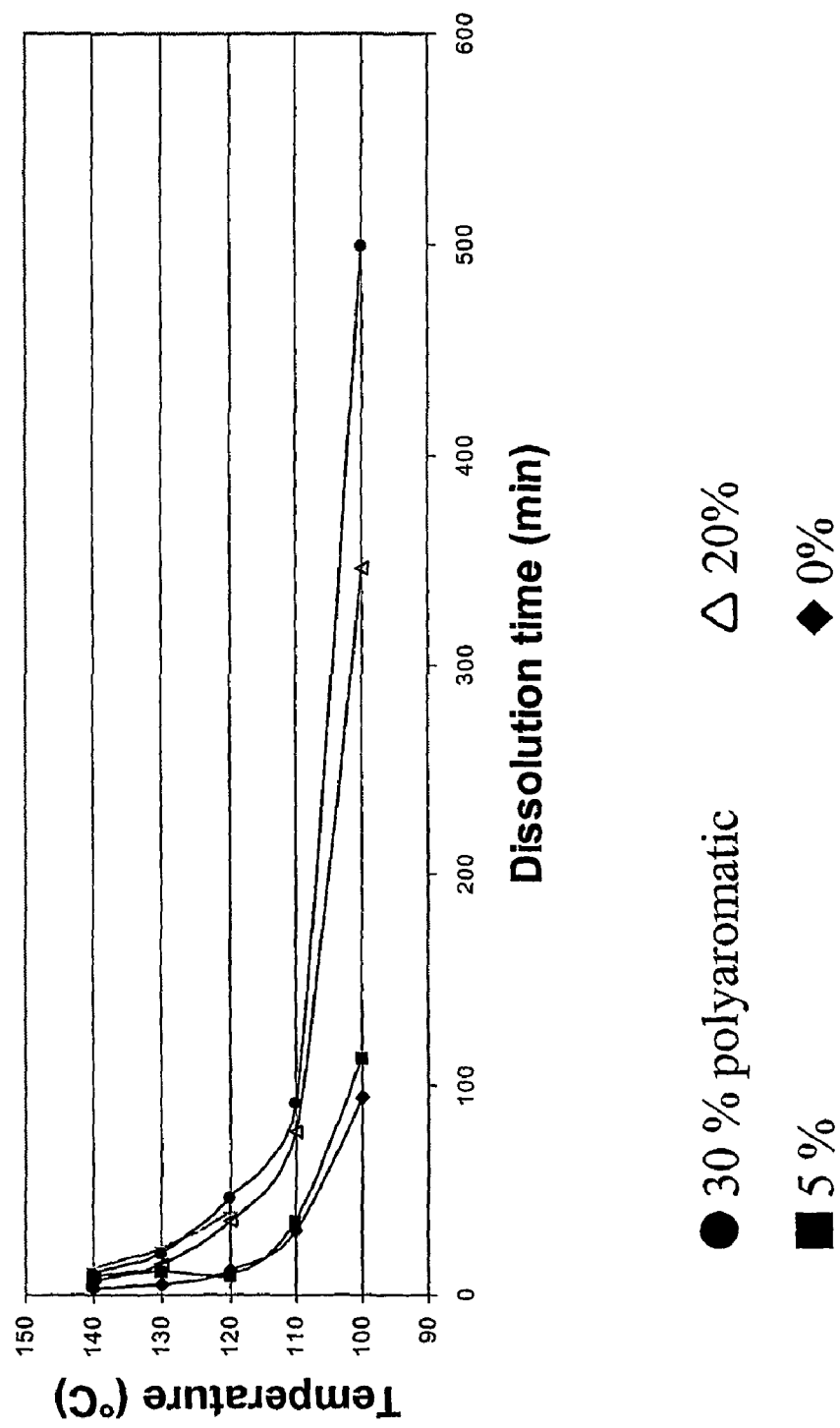

Figure G2
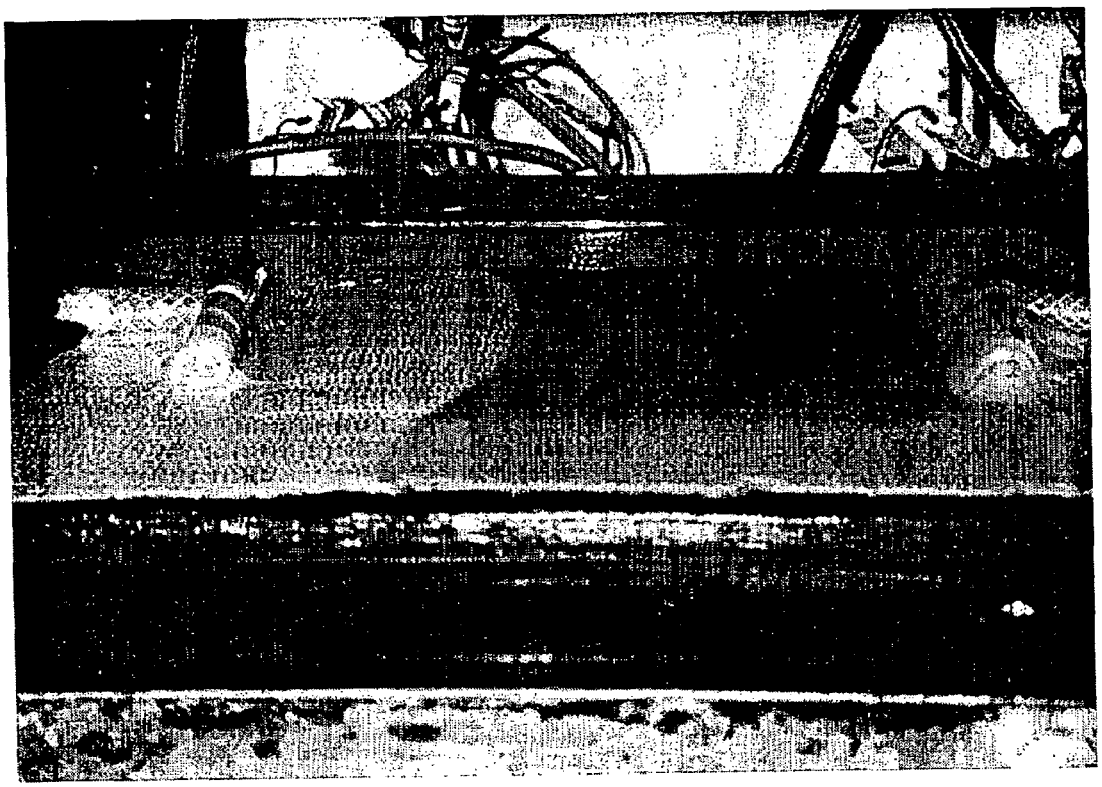

Figures G2 a and b

Figure G2c
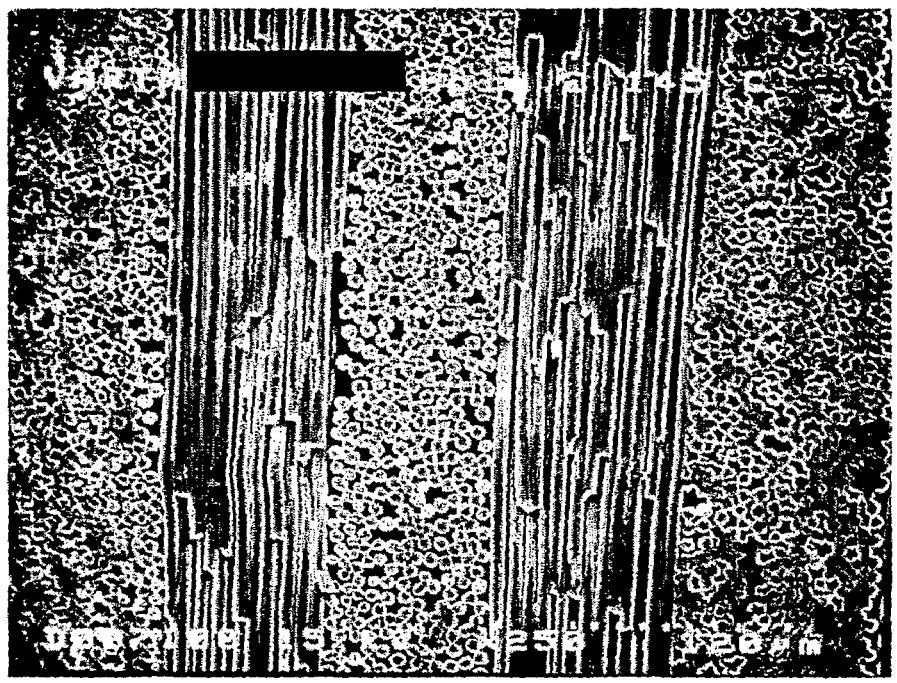

Figure G2d
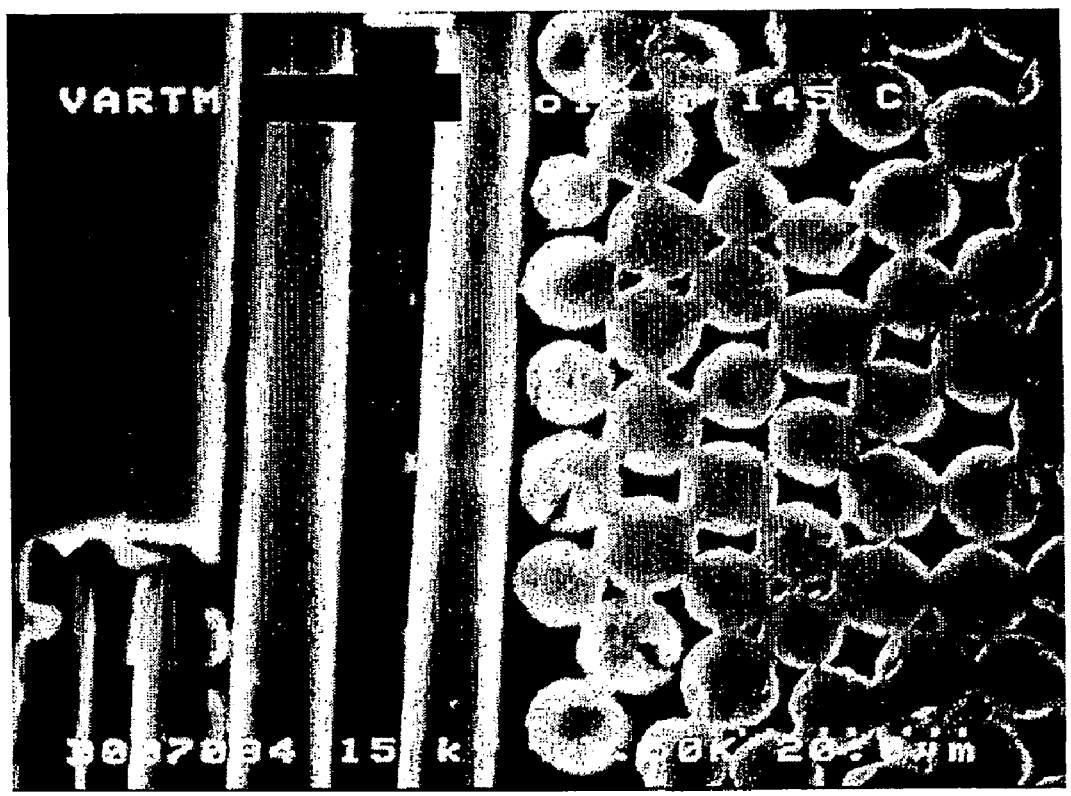

FLEXIBLE POLYMER ELEMENT AS TOUGHENING AGENT IN PREPREGS

The present invention relates to a flexible polymer element for use in a curable composition wherein the element is adapted to dissolve in the curable composition, a method for the preparation thereof, a support structure or carrier for a curable composition comprising the at least one flexible polymer element together with reinforcing fibres, configurations of support structures and carriers, methods for preparation thereof, a curable composition comprising the at least one flexible polymer element or the support structure or carrier and a curable resin matrix, a kit of parts comprising the components thereof and a method for selection thereof, a method for preparation and curing thereof, and a cured composite or resin body obtained thereby, and known and novel uses thereof.

More particularly the invention relates to a flexible polymer element as defined in the form of a fibre, film or the like, method for the preparation thereof, support structure or carrier for a curable composition as defined in the form of a fabric or the like, and associated aspects as defined.

Fibre-reinforced resin matrix composites are widely accepted for use as high strength low weight engineering materials to replace metals in aircraft structural applications and the like. These composite materials may be made by laminating prepregs comprising high strength fibres, such as glass, graphite (carbon), boron or the like impregnated with a matrix of typically thermoplastic resin. Important properties of such composites are high strength and stiffness and reduced weight.

Composites must meet very stringent requirements in terms of those properties which are significant in or will affect the safety of the structure comprising the composite when subject to environmental conditions including extremes of temperature (thermal cycling resistance), exposure to ultraviolet and other radiation types, exposure to atmospheric oxygen (oxidation resistance) exposure to moisture and the like; and additionally when subject to hazards such as exposure to solvents etc, in addition to the usual requirements to withstand all conceivable load and stress types, resist delamination, fracture and the like.

Curable compositions comprising a blend of polymer resins and optionally additionally comprising reinforcing fibres are characterised by individual physical and chemical properties of the constituent polymer resins and fibres, whereby compositions may be selected for a specific use. Typically therefore a thermoset resin component is present which confers high solvent resistance, thermal cycling resistance etc. In addition a thermoplast resin component is present which confers high level of toughness etc, and reinforcing fibres are present which confer high levels of stiffness, for reduced weight etc.

Typically the respective resins and the fibres are blended or shaped in suitable manner and cured, and retain their distribution or shape by physical and in some cases by chemical interaction in a desired end product. Nevertheless the blending or shaping is in many cases complicated by factors such as high viscosity of resins, particularly when it is desired to impregnate reinforcing fibres, a short "pot life" (pre-gelling time), obtaining uniform or selective dispersion and the like.

Recently there has been an emergence of an alternative technology for manufacturing composite parts, which technology is generally referred to as Liquid Moulding (LM). This approach differs from that of conventional prepreg in that the fibres (dry) are placed into a mould/tool and matrix resin is injected/infused directly into the fibres.

Liquid Moulding (LM) is a generic term which covers processing techniques such as Resin Transfer Moulding (RTM), Liquid Resin Infusion (LRI), Resin Infusion Flexible Tooling (RIFT), Vacuum Assisted Resin Transfer Moulding (VARTM), Resin Film Infusion (RFI) and the like. The potential benefits that LM has to offer over that of a conventional prepreg route are reduced scrap, reduced lay-up time, a non-dependence on tack and drape and increased shelf life properties. In practice the use of LM technology finds its greatest use in specialised operations in which complex composite structures (multi components) are required, locally strengthened structures are required by selectively distributing carbon fibres in the mould and where the need for very large structures is required e.g. marine applications.

Resin Film Infusion (RFI) combines an LM technology with conventional prepreg, e.g. in RTM or RFI autoclave curing, individual prepregs are stacked in a prescribed orientation to form a laminate, the laminate is laid against a smooth metal plate and covered with successive layers of porous teflon, bleeder fabric and vacuum bag. A consolidating pressure is applied to the laminate, to consolidate the individual layers and compress bubbles of any volatile that remain. The use of autoclave creates a limit to the size of the components that is possible to produce. Currently for example is not possible to build a boat hull, a yacht or a bridge using an autoclave because that would require a huge pressurized autoclave adding enormous capital costs and running costs.

VARTM simplifies hard mold RTM by employing only one-sided moulds, and using vacuum bagging techniques to compress the preform. However mould filling times can be far too long, if indeed the resin does not cure before total fill.

RIFT provides much faster fill times. A 'distribution media', being a porous layer having very low flow resistance, provides the injected resin with a relatively easy flow path. The resin flows quickly through the distribution media, which is placed on the top of the laminate and then flows down through the thickness of the preform. The use of fibres to create channels for the resin infusion is known (WO0102146A1 (Plastech), U.S. Pat. No. 5,484,642 (Brochier), U.S. Pat. No. 5,326,462 (Seemann)) however these remove the channels are either removed during the degassing and curing stage or if they are left in they remain intact post cure.

One of the problems experienced by end users is that it is currently very difficult to manufacture quality components by RIFT or VARTM out of the autoclave. Curing with vacuum only or with no pressure cause the components to have very high void content thus leading to poor mechanical properties.

We have now surprisingly found a method to obtain composite panels manufactured with VARTM and RIFT cured with atmospheric pressure or vacuum only that are easy to inject and show a void content close to 0%. The invention provide the use of fibres during degassing which are absent in the final cured component.

A common disadvantage concerning the prepreg and LM technologies is in the area of very tough composite materials. The very nature of the impregnation or injection process of the resin into the fibre reinforcement e.g. carbon fibre fabrics, requires that its Theological properties, viscosity and elasticity, are able to allow infiltration of the resin, throughout the fabric. This is essential if the resulting composite structure is to be free of voids and if long impregnation or injection/infusion times and high injection temperatures are to be avoided.

Resin systems which have high impact performance usually contain thermoplastic toughening agents or the like which increase the viscosity and elastic properties of the resin making it very difficult to impregnate or inject. High impregnation and injection temperatures and pressures are required to make this possible.

A potential way to efficiently provide thermoplastic toughened composites is to remove the thermoplastic from the resin matrix and apply it in some way directly in or onto the fibres or fabric. This can be achieved using several approaches.

In the case of LM technology, in which complex shapes are manufactured by applying a binder to the preform as a powder, liquid or film to fix the preform shape, prior to injecting the thermoplastic and resin matrix, it is difficult to get any significant quantities of thermoplastic and matrix into the preform, and excessively high temperature and pressure are required. Moreover composite materials thus possess only moderate increases in toughness, since there is a limit to the amount of thermoplastic which can physically be injected, and may suffer from the presence of the binder, if incompatible with the matrix.

It is also known for example in EP 392939 to prepare pre-preg with reinforcing fibres by weaving or comingling with thermoplastic fibres and melting to impregnate. These systems do not however attempt to introduce an additional matrix into the prepreg, and typically employ very high molecular weight thermoplastic polymer, which requires excessively high temperature and pressure to melt.

It has been proposed to use hybrid matrix thermosetting resins including a high molecular weight thermoplastic polymer, as a particulate dispersion as disclosed for example in GB-A-2060490, or as a particulate coating or film interleave of the fibre-reinforced matrix resin prepregs as disclosed in U.S. Pat. No. 5,057,353. Nevertheless dispersion is typically poor due to difficulty in controlling distribution of particles and uniformity of particle size which can influence rate and degree of melting, and the barrier effect of a continuous film present in the matrix. U.S. Pat. No. 5,288,547 discloses prepregs for curable compositions comprising thermoplastic polymer membrane interleave which is porous. The membrane is incorporated in the prepreg during preparation, the membrane laid up against a sheet of reinforcing fibre and melting at elevated temperature and pressure to impregnate the fibres; alternatively prepreg is laid up with membrane therebetween and melted to impregnate prior to curing to form a composite part; alternatively the membrane is proposed for RTM application laid up between layers of dry fibre in a mould, melted to impregnate, and liquid resin injected into the mould.

While this goes some way to alleviating the extreme conditions required, there is still a need for a more versatile solution enabling improved blending of components and more flexibility and control of nature and amount of dispersions. Specifically the thermoplastic and resin matrix preclude the possibility to pre-blend and do not blend or diffuse effectively on curing. Moreover there is a need to introduce greater amounts of highly viscous polymers into the system, such as toughening agents for example thermoplastics.

We have now surprisingly found that we are able to provide typically high viscosity polymers in composite structures in manner to overcome the problems above described, by provision as a soluble flexible polymer element in solid phase. This is surprising since it would be expected that the properties of solubility at relatively low temperature and of cohesion (as a coherent element) are mutually exclusive, i.e. requiring low and high MW respectively or an ineffective compromise thereof.

We have moreover found a way to provide a support structure or carrier for a curable composition comprising a flexible polymer element in which fibres are held in a desired configuration, without use of a mould, by the element, which dissolves and disperses in the curable composition prior to or at the start of the curing process.

It has long been known to prepare synthetic fibres such as viscose, nylons, flame retardant polymers and the like which are used in the textile industry, woven as fabrics, having good drape and fibre strength. Whilst some of these may prove in fact to be soluble in a resin matrix according to the present invention, this behaviour has not as yet been observed, the benefits of solubility have to date not been perceived and the fibres presented in the form of a support structure or carrier as hereinbefore defined, in turn put to use in the fabrics or in other industries such as the composites or adhesives industry.

In some reinforced composite technology it is also known to introduce thermoplastic polymer in the form of strong stitching such as polyester to hold complex reinforcing structures together, such as 3-dimensional non-crimped fabrics (NCF), so that fibres are held in place in alignment and orientation during the injection, infusion or application of thermosetting resin. The stitches are of very high melting point polymer such as 230° C., which is moreover orientated and therefore quite crystalline so that melting or solution are not possible, the stitching remains intact post cure.

This can lead to a number of problems such as the moisture sensitivity of the stitch, coefficient of thermal expansion mismatch, shrinkage, loss of mechanical and environmental performance and general incompatibility of the stitch with the cured thermosetting resin, as well as aesthetic concerns due to the roughened or patterned surface of the finished articles.

There is a need for an improved polymer stitching to hold fibre and fabric structures in place for injection or infusion and curing, which does not deleteriously affect mechanical properties of the cured composite.

We have now surprisingly found that flexible polymer elements may be provided in the form of fibres and the like, which are useful for stitching, which dissolve in the curable composition.

We have also surprisingly found that compositions may be provided comprising elevated levels of viscous component polymers, by means of providing the viscous polymer in both fluid form and in flexible polymer element solid phase form.

Accordingly in the broadest aspect of the invention there is provided a flexible polymer element for a curable composition wherein the flexible polymer element is in solid phase and adapted to undergo at least partial phase transition to fluid phase on contact with a component of the curable composition in which it is soluble, at a temperature which is less than the temperature for substantial onset of gelling and/or curing of the curable composition.

Reference herein to a flexible polymer element is to any shaped element which is both chemically and physically adapted to be at least partially dissolved in a resin matrix making up the curable composition whereby the polymer is dispersed at least partially into the matrix as a common phase by dissolution whereby it loses at least partially its physical element form to the curable composition.

Suitably the at least one flexible polymer element is elongate in at least one direction for example comprises a textile such as a mono or multi fibre or filament, ribbon, film or mixtures or weave thereof.

Suitably the flexible polymer element is adapted to dissolve during the preliminary stages of the curing process, during temperature ramping to the temperature for onset of gelling and/or curing, whereby the composition is held in desired configuration by the flexible polymer element until the curable component viscosity increases, obviating the need for support by the flexible polymer element or by a mould.

The flexible polymer element may be adapted for use in the presentation or processing of the curable composition whereby the dissolved polymer therefrom may be substantially undetectable and insignificant in the properties of the cured composition. It is a particular advantage that flexible polymer elements may be provided which are soluble and may be traceless in the cured product, yet strong enough for use in supporting, carrying or assembling other composition components. Alternatively the flexible polymer element may be for use as a component of the curable composition and adapted to contribute to the properties of the end product. It is a further advantage that curable compositions may be provided in which viscous polymers may be included making up a significant part of the polymer phase of the end product. Alternatively the flexible polymer element may be for use in the processing of a curable composition with improved composite properties, and may be traceless or otherwise in the final cured product.

In a particular advantage of the present invention the fluid phase of the flexible polymer element undergoes excellent dispersion by solvating effect of curable component. This is particularly important to the properties of the cured product. We have surprisingly found that scanning by Raman spectroscopy at co-ordinates throughout the cured product shows 100% dispersion, with identical scans at each co-ordinate.

In a further advantage of the present invention flexible polymer elements provide an excellent outlife and remain in solid phase at ambient or elevated temperature, up to 300 or 400° C., in the absence of dissolving resin, and can be left for years at or below this temperature, without advance of the composition, and can thereafter undergo phase transition as desired by contact with dissolving resin and curing under conditions as hereinbefore defined, for example temperatures in excess of 60° C., for example of the order of 140° C.

Phase transition is by solution, optionally assisted by heat, in a resin matrix component of the curable composition. It is a particular advantage that that soluble polymer elements enable improved blending.

The polymer of the flexible element may be adapted to form a common phase on curing of the curable composition, e.g. in solution in the thermosetting resin or may wholly or partially phase separate to produce a two phase matrix resin system. It is well documented for example in EP 311 349 that the toughness of the thermoset/thermoplastic blends is related, among other things, to the morphology and phase sizes in the cured blend. The desired level of matrix resin toughness is obtainable by control of the morphology and phase sizes in the thermoset/thermoplastic blend through the chemistries of the thermoplastic polymer and the thermosetting resin precursors, as well as the other parameters of any desired morphology.

FIGS. B1 and B4 illustrate the process of dissolution, and phase separation in the case of a fibre as flexible polymer element characterised by complete dissolution. In FIG. B4 is shown typical two phase morphologies obtained in thermoplast/thermoset systems, which may be obtained according to the present invention. Phase transition e.g. solution of flexible element may be determined or monitored with use of any suitable techniques, for example TEM, SEM and the like and such techniques may be employed by those skilled in the art to determine suitable flexible element characteristics and curable composition characteristics and processing conditions for commercial production of cured compositions.

The polymer forming the flexible polymer element is preferably adapted to undergo phase transition, i.e. to at least partially dissolve in the resin matrix at a temperature Ts in a range at least part of which is less than the cure temperature of the resin matrix Tc. The polymer element may be configured in manner to improve or hinder thermal conductivity and speed or slow transfer of heat into the element to endure rapid or delayed solution thereof.

The polymer element may undergo complete or partial phase transition, e.g. may completely dissolve, or may partially dissolve whereby a portion thereof is dispersed into the matrix and a portion retains its elemental form, either by ensuring that precuring time and temperature are insufficient for complete dissolution or preferably by providing the polymer as a blend or co-polymer with one or more further insoluble polymers, for example in the form of a random or block co-polymer or other blend or derivative with organic or inorganic substrates. By this means the polymer element may be combined with one or more further polymers or other soluble or insoluble organic or inorganic substrates in the cured composition.

The flexible element may contain for example conventional toughening agents such as liquid rubbers having reactive groups, aggregates such as glass beads, rubber particles and rubber-coated glass beads, metal particles such as Ti, Al or Fe, filler such as polytetrafluorethylene, silica, graphite, boron nitride, clays such as mica, talc and vermiculite, pigments, nucleating agents, and stabilisers such as phosphates; agents for increased solvent resistance such as F-containing agents, flame retardants such as metal oxides FeO & TiO crystalline polymers incorporated as blend or as block or random copolymer for example polyether ketones; conventional binder such as low MW thermoset monomers for example epoxy, acrylic, cyanate, ester, BMI-type polymers and the like; conventional adhesives such as epoxy polymers and the like; conventional coating agents etc.

Preferably particles, beads and the like have size in the nm and micron range, according to the thickness or diameter of the flexible polymer element, preferably clay particles are 0.5 to 5 nm e.g. 0.1 nm, Ti particles may be 1–6 micron e.g. 2 micron.

It is a particular advantage of the invention that such conventional toughening agents, for example a few percent of high MW rubbers such as Nippol and the like make conventional blends highly viscous, the flexible polymer element of the present invention serves as an excellent carrier whereby concerns such as viscosity, incompatible polymer melt temperatures and the like are overcome.

In the case that uniform distribution of polymer from the flexible polymer element is desired, preferably the flexible polymer element is in a form suitable for intimate mixing with other component(s) of a curable composition, e.g. in the form of a fibre, filament, ribbon, or the like, and in the case that local distribution is desired the flexible polymer element may be in any of these forms or in any other form suitable for non-intimate presentation in the other component(s), e.g. a film for coating, adhesion or local effect, e.g. toughening reinforcement.

The flexible element preferably is a fibre or filament having diameter d, or is a film or ribbon having thickness t wherein d or t are in the range up to 100 micron, preferably from 1 to 80 micron, for example 30–80 micron, more preferably 30–65 micron. Flexibility is a compromise between element thickness or diameter and polymer modulus.

Fibres may be provided in desired Tex (weight fibre in g/m fibre, indicating the linear density) which may be in the range 5–150 Tex, and is controlled in known manner during the fibre preparation.

The element is preferably characterised by a % elongation to break in the range 1–75, preferably 3–50% lower for stitching application and higher for weaving application, conferred by polymer type and by the method of manufacture, e.g. stretching and orientation; also by toughness measured as Dtex, the linear density based on element, e.g. fibre weight per unit length.

Suitably the flexible polymer element is conformable, deformable, drapeable or manipulateable in suitable manner to be presented in a curable composition as hereinbefore defined. Without being limited to this theory it is thought that physical interactions are created during the manufacture of the polymer element which induce or enhance flexibility to particularly advantageous effect by virtue of orientation, chain interaction, individual polymer chain characteristics and the like, contributing to elastomeric behaviour and properties of stretch and strength, enabling knotting, stitching, winding and the like.

The flexible polymer element may be characterised by binding or adhesion properties, for example conferred by softening above ambient temperatures, or comprising monomers for example thermoset (epoxy) monomers or other known binders, to assist in the physical association in a curable composition as hereinbefore defined. In this manner the flexible polymer element of the invention is particularly suitable for use in LM technology as hereinbefore defined.

In principle, any polymer which is at least partially soluble in a curable, eg a thermosetting, matrix resin below its curing temperature and which may be formed into a flexible element as hereinbefore defined by known or novel means, such as extrusion, spinning, casting etc., may be employed in the practice of the invention. Preferably the flexible polymer element comprises a polymer having elastomeric properties at or above its glass transition temperature or softening temperature, and is selected from natural or synthetic rubbers and elastomers, thermoplastics and mixtures, miscible or immiscible blends thereof or random or block copolymers with other amorphous or crystalline polymers and/or monomers. More preferably the flexible element comprises an amorphous polymer having elastomeric properties additionally below its glass transition temperature or softening temperature, more preferably comprises a thermoplastic polymer. Useful thermoplastic include polymers such as cellulose derivatives, polyester, polyamide, polyimide, polycarbonate, polyurethane, polyacrylonitrile, poly(methyl methacrylate), polystyrene and polyaromatics such as polyarylethers, polyarylketones and particularly polyarylsulphones. Copolymers may also be used such as polyesteramide, polyamideimide, polyetherimide, polyaramide, polyarylate, poly(ester) carbonate, poly(methyl methacrylate/butyl acrylate), polyethersulphone-etherketone. Polymer blends may also be used.

Polyurethanes include thermoplastic polyurethane rubber. Polyamides include nylon and other axis oriented long chain polymers which can be formed into filament or film, polyester includes the straight chain condensation product of terephthalic acid and ethan-1, 2-diol (polyester), poly acrylates includes acrylic fibres synthesised from a plurality of monomers including at least 85 wt % acrylonitrile, cellulose derivatives include cellulose diacetate, viscose fibres, polyetherketones are based on bisphenol A.

Preferably the thermoplastic is a polyaromatic. Preferably the polyaromatic polymer comprises same or different repeating units of the formula:

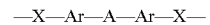

wherein A is selected from $SO_2$, a direct link, oxygen, sulphur, —CO— or a divalent hydrocarbon radical;
X is a divalent group as defined for A, which may be the same or different, or is a divalent aromatic group such as biphenylene;
Ar is an aromatic divalent group, or multivalent including any one or more substituents R of the aromatic rings, each R independently selected from hydrogen, $C_{1-8}$ branched or straight chain aliphatic saturated or unsaturated aliphatic groups or moieties optionally comprising one or more heteroatoms selected from O,S,N, or halo for example Cl or F; and groups providing active hydrogen especially OH, $NH_2$, NHR— or —SH, where R— is a hydrocarbon group containing up to eight carbon atoms, or providing other cross-linking activity especially epoxy, (meth) acrylate, cyanate, isocyanate, acetylene or ethylene, as in vinyl, allyl or maleimide, anhydride, oxazoline and monomers containing saturation; and
wherein said at least one polyaromatic comprises reactive pendant and/or end groups, preferably selected from reactive heteroatom, heteroatom containing or crosslinking groups as defined for R.

Specifically the at least one polyaromatic comprises at least one polyaromatic sulphone comprising ether-linked repeating units, optionally additionally comprising thioether-linked repeating units, the units being selected from the group consisting of

and optionally additionally

wherein A=CO or $SO_2$, Ph is phenylene, n=1 to 2 and can be fractional, a=1 to 4 preferably a=1, 2 or 3 and, can be fractional and when a exceeds 1, said phenylenes are linked linearly through a single chemical bond or a divalent group other than —CO— or —$SO_2$— or are fused together directly or via a cyclic moiety, such as acid alkyl group, a (hetero) aromatic or cyclic ketone, amide, imide, imine or the like.

Preferably the polyaromatic comprises polyether sulphone, more preferably a combination of polyether sulphone and of polyether ether sulphone linked repeating units, in which the phenylene group is meta- or para- and is preferably para and wherein the phenylenes are linked linearly through a single chemical bond or a divalent group other than sulphone, or are fused together. By "fractional" reference is made to the average value for a given polymer chain containing units having various values of n or a.

Preferably the repeating unit -(PhSO$_2$Ph)- is always present in said at least one polyarylsulphone in such a proportion that on average at least two of said units—

$(PhSO_2Ph)_n$ are in sequence in each polymer chain present, said at least one polyarylsulphone having reactive pendant and/or end groups.

Additionally, in the polyarylsulphone polymer, the relative proportions of the said repeating units is such that on average at least two units $(PhSO_2Ph)_n$ are in immediate mutual succession in each polymer chain present and is preferably in the range 1:99 to 99:1, especially 10:90 to 90:10, respectively. Typically the ratio is in the range 75–50 $(Ph)_a$, balance $(PhSO_2Ph)_n$. In preferred polyarylsulphones the units are:

X PhSO$_2$Ph XPhSO$_2$Ph("PES") and (I)

X(Ph)$_a$XPh SO$_2$Ph("PEES") (II)

where X is O or S and may differ from unit to unit; the ratio is I to II (respectively) preferably between 10:90 and 80:20 especially between 10:90 and 55:45, more especially between 25:75 and 50:50, or the ratio is between 20:80 and 70:30, more preferably between 30:70 and 70:30, most preferably between 35:65 and 65:35.

The preferred relative proportions of the repeating units of the polyarylsulphone may be expressed in terms of the weight percent SO$_2$ content defined as 100 times (weight of SO$_2$)/(weight of average repeat unit). The preferred SO$_2$ content is at least 22, preferably 23 to 25%. When a=1 this corresponds to PES/PEES ratio of at least 20:80, preferably in the range 35:65 to 65:35.

The above proportions refer only to the units mentioned. In addition to such units the polyarylsulphone may contain up to 50 especially up to 25% molar of other repeating units: the preferred SO$_2$ content ranges (if used) then apply to the whole polymer. Such units may be for example of the formula:

—Ar—A—Ar— in which A is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'dihydroxybiphenyl, resorcinol, dihydroxynaphthalene (2,6 and other isomers), 4,4'-dihydroxybenzophenone, 2,2'di(4-hydroxyphenyl)propane and-methane.

If a bis-thiol is used, it may be formed in situ, that is, a dihalide as described for example below may be reacted with an alkali sulphide or polysulphide or thiosulphate.

Other examples of such additional units are of the formula:

-Ph-Q(Ar—Q')$_n$-Phin which Q and Q', may be the same or different, are CO or SO$_2$: Ar is a divalent aromatic radical; and n is 0, 1, 2 or 3 provided that n is not zero where Q is SO$_2$. Ar is preferably at least one divalent aromatic radical selected from phenylene, biphenylene or terphenylene. Particular units have the formula:

-Ph-Q-[-Ph-)m-Q'-]n-Phwhere m is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl) biphenyl, 1,4,bis(4-bis(4-halobenzoyl)benzene and 4,4'-bis(4-halobenzoyl)biphenyl.

They may of course have been derived partly from the corresponding bisphenols.

The polyaromatic polymer may be the product of nucleophilic synthesis from halophenols and/or halothiophenols. In any nucleophilic synthesis the halogen if chlorine or bromine may be activated by the presence of a copper catalyst.

Such activation is often unnecessary if the halogen is activated by an electron withdrawing group. In any event fluoride is usually more active than chloride. Any nucleophilic synthesis of the polyaromatic is carried out preferably in the presence of one or more alkali metal salts, such as KOH, NaOH or K2CO3 in up to 10% molar excess over the stoichiometric.

The polymer may be characterised by a range of MW which may typically be defined either by Mn, peak MW and other means, usually determined by nmr and gpc. Preferably the polymer is selected in the range up to 70,000 for example 9000–60,000 for toughening, and in this case the number average molecular weight Mn of the polyaromatic is suitably in the range 2000 to 25000, preferably 2000 to 20000, more preferably 5000 or 7000 to 18000, most preferably 5000 or 7000 to 15000.

The polyaromatic is preferably of relatively low molecular weight. It also preferably contains in-chain, pendant or chain-terminating chemical groups which are capable of self-assembling to form higher molecular weight complexes through non covalent bonds with similar or different chemical groupings in the polymer. These maybe, for example, hydrogen bonds, London forces, charge transfer complexes, ionic links or other physical bonds. Preferably the non-covalent bonds are hydrogen bonds or London forces which will dissociate in solution to regenerate the relatively low molecular weight precursor polyaromatic. The polyaromatic preferably contains pendant or chain-terminating groups that will chemically react with groups in the thermosetting resin composition to form covalent bonds. Such groups may be obtained by a reaction of monomers or by subsequent conversion of product polymer prior to or subsequently to isolation. Preferably groups are of formula:

—A'—Y where A' is a divalent hydrocarbon group, preferably aromatic, and Y is a group reactive with epoxide groups or with curing agent or with like groups on other polymer molecules. Examples of Y are groups providing active hydrogen especially OH, NH$_2$, NHR' or —SH, where R' is a hydrocarbon group containing up to 8 carbon atoms, or providing other cross-linking reactivity especially epoxy, (meth)acrylate, cyanate, isocyanate, acetylene or ethylene, as in vinyl allyl or maleimide, anhydride, oxazaline and monomers containing saturation. Preferred end groups include amine and hydroxyl.

In a particular advantage of the invention the polymer of the flexible polymer element may have low molecular weight, but be adapted to react on curing to provide the higher molecular weight required for effective toughening or the like, as disclosed in co-pending GB 0020620.1 the contents of which are incorporated herein by reference. This is of particular advantage since it further alleviates the problems of high viscosity. Specifically the polymer may comprise chains of at least one aromatic polymer or a mixture thereof together with at least one chain linking component wherein the at least one aromatic polymer comprises polymer chains of number average molecular weight (Mn) in a first range of 2000 to 11000, especially 3000 to 9000 and characterised by a polymer flow temperature, and wherein one of the at least one polyaromatic and the at least one chain linking component comprises at least one reactive end group and the other comprises, at least two linking sites reactive end groups Y and chain linking sites, Z are selected, OH, NH$_2$, NHR or SH wherein R is a hydrocarbon group containing up to 8 carbon atoms, epoxy, (meth)acrylate, (iso)cyanate, isocyanate ester, acetylene or ethylene as in vinyl or allyl, maleimide, anhydride, acid, oxazoline and monomers containing unsaturation characterised in that a plurality of the end groups are adapted to react with the linking sites at chain linking temperature in excess of the polymer flow temperature to form linked polymer chains of number average molecular weight (Mn) in a second range of 9000 to 60000, especially 11000 to 25000, which is in excess of the first range, substantially thermoplastic in nature.

Flow temperature is defined as the temperature at which the polymer attains a suitably fluid state to enable a degree of polymer chain mobility to align itself for reaction. Preferably the flow temperature corresponds to a solution temperature at which the polyaromatic dissolves.

Chain linking temperature is defined as the temperature at which the polymer chain ends reaction is initiated. Preferably the chain linking temperature is higher than a product processing temperature, to remove solvent and improve wet out of the prepreg which leads to better quality prepreg with easier handling characteristics. Preferably the chain linking temperature corresponds to the gelling or curing temperature.

Chain linking components are preferably selected from the formula $$B(Z)n$$

wherein B is an oligomer or polymer backbone or is an aliphatic, alicyclic or aromatic hydrocarbon having from 1 to 10 carbon atoms and optionally including heteroatoms N, S, O and the like and optionally substituted, or is C, O, S, N or a transition metal nucleus or is a single bond, n is a whole number integer selected from 2 to 10000 preferably 2 to 8 or 5 to 500 or 500 to 10000.

Accordingly it will be apparent that self reaction between methacrylate ended polymer and chain linking component or between maleimide ended polymer and chain linking component or between oxazoline ended polymer and chain linking component for example is possible and within the scope of the present invention.

In one preferred embodiment the reactive end group is hydroxy and corresponds to a linking site functionality which is epoxy, whereby reaction thereof produces a β hydroxy ether linkage in polymers of increased number average molecular weight having either hydroxy or epoxy end groups as desired. Alternatively, the reactive end group is NH$_2$ and the linking site functionality is anhydride, whereby reaction thereof produces an imide linkage in polymers of increased number average molecular weight having NH$_2$ or anhydride end groups. Alternatively the reactive end group is NH$_2$ and the linking site functionality is maleimide. Mixtures of the above may be employed to produce a mixed architecture including a plurality of reactive end group-linking site combinations.

Preferred linking components include multifunctional epoxy resins, amines and in particular triazines, and anhydrides. Suitable epoxy resins and amines are selected from resins hereinafter defined for matrix resins, and are preferably selected from MY0510, Epikote 828 [O(CHCH) CH$_2$OPh]$_2$C(CH$_3$)$_2$ and the Cymel class of epoxies including Cymel 0510, benzophenone tetra carboxylic acid dianhydride (BTDA) [O(CO)$_2$Ph]$_2$CO, and maleic anhydride.

Preferably flexible elements comprising two or more polymers comprise a blend or copolymer of amorphous polymers or of amorphous and semi crystalline polymer. This is of particular advantage in enabling the preparation of multiblock compositions having lowered processing temperatures whilst nevertheless retaining excellent product properties such as solvent resistance.

In a further aspect of the invention there is provided a method for the preparation of a flexible polymer element as hereinbefore defined by known or novel methods, for example comprising track etching or mechanical stretching the polymer resin melt, phase precipitation methods such as immersion, evaporation, solvent casting, thermal and humidity methods or forming the element from its monomeric precursor and polymerising.

Preferably elements in the form of fibres or film are obtained by continuous extrusion of resin melt onto reels and film forming or spinning as known in the art of synthetic textiles manufacture by mechanical stretching with heating, more preferably by providing the polymer melt, drawing off in elemental shape, subjecting to a heating and mechanical stretching regime which may orient polymer chains and render the element elastomeric and predisposed to dissolution, and cooling, preferably by pulling in air for a desired distance, eg 50 to 500 mm. Preferably polymer melt is drawn off through a die head or the like providing a desired number of apertures or slots, using a pump with controlled pump rate for a desired linear density (Tex) of polymer for example up to 180 Tex.

The element may be prepared from micronised or unmicronised polymer, pellets or other extrudate and the like. Preferably fibres are prepared as multifilaments of up to 20 same or different polymer filaments, which are drawn off from the molten polymer, cooled and optionally twisted as desired, and then subjected to heating and stretching. The multifilament is more resistant to breaking, there is a trade off between higher strength and lower flexibility in selection of filaments and twists/meter. Twisting is conventionally used for preparing stitching fibres, to counteract undesired natural twist and breakage.

In a further aspect of the invention there is provided a support structure or carrier for a curable composition comprising at least one flexible polymer element as hereinbefore optionally defined together with structural elements, preferably reinforcing fibres, wherein the at least one flexible polymer element is present in solid phase and adapted to undergo at least partial phase transition to fluid phase on contact with a resin matrix component of a curable composition in which the element is soluble, at a temperature which is less than the temperature for substantial onset of gelling and/or curing of the curable component.

Reference herein to a support structure or carrier is to a presentation of the polymer element in physical, preferably intimate association with the reinforcing fibres, for example mono or multi filament fibres, ribbons and/or films are presented as the fibres or ribbons alone or with reinforcing fibres in a support structure or carrier comprising a fabric, web, weave, non woven, overwinding, preform, scrim, mesh, fleece, roving, prepreg, composite or laminar film or interleave or the like or a mixture thereof, or stitched, sewn, threaded or the like presentations thereof. Suitably the polymer element serves to support the further component(s) of the structure or to carry the reinforcing fibres and/or resin matrix, and optionally any further component(s) of a desired curable composition. The support structure or carrier may be mutually supporting or carrying whereby the at least one flexible polymer element is additionally supported by or carried by the reinforcing fibres or an additional resin matrix.

Reference herein to structural or reinforcing fibres is to insoluble fibres as known in the art which stiffen composites, such as organic or inorganic polymer, carbon, glass, inorganic oxide, carbide, ceramic or metal and the like fibres.

The support structure or carrier of the invention may have any number of physical presentations.

The support structure or carrier may be in the form of a preform as known in the art but wherein the flexible polymer element is present as fibres or ribbons amongst the reinforcing fibres in aligned or mis-aligned or stitched fashion or as a multi filament of soluble polymers fibres and reinforcing fibres which may be braided, spun or over wound, or is present as a film laid up against the reinforcing fibres and adhered or crimped or otherwise physically associated therewith. Particularly advantageous presentations include non-crimped fabrics of reinforcing fibre with flexible polymer fibre stitching, preforms of aligned or random reinforcing and flexible polymer fibres which may be stitched or punched or softened to confer binding, or other configurations in which flexible polymer element is presented non uniformly with respect to the reinforcing fibre, to locally confer properties such as toughening and the like characteristic of the flexible polymer, for example around bolt holes, fastening apertures, high stress panels and the like.

In the case of a comingled structure or carrier comprising flexible polymer element and continuous, short or chopped reinforcing fibres the at least one flexible element is a monofilament or low twist/meter higher multifilament fibre, optionally cut to comparable length and simply admixed. In the case of a woven or braided structure or carrier with the reinforcing fibres woven to produce 100% flexible polymer element fabrics, the element is monofilament or lower multifilament. When the flexible element is used as a stitch it is preferably of lower % elongation. In any case the structure or carrier can be formed at any suitable stage in the manufacture of the fabric based reinforcements. It can also be applied after the manufacture of the fabric for example in the case where a hole is created in the assembled fabrics (preforms) or to physically stitch multi-component parts together, prior to resin injection/infusion.

In a preferred configuration, a support structure or carrier as hereinbefore defined preferably comprises structural fibres, laid up in desired manner, and fibre form flexible polymer element in the form of stitching, adapted to undergo phase transition as hereinbefore defined in manner to disperse locally or universally in the curable composition. Suitably the support structure or carrier comprises therefore a fabric in which the structural fibres or fabric are laid up in random, mono or multiaxial, (co) linear or (co) planar arrangement and the flexible polymer element fibres are in the form of stitching in conventional manner securing the fibre or fabric or assemblies thereof as desired. Preferably stitching comprises upper and lower thread securing fibres, fabrics or assemblies thereof from opposite faces. The support structure or carrier provides at least partially traceless stitching, preferably provides traceless stitching. Suitably the flexible polymer element is provided in controlled amount with reference to Tex (weight of flexible polymer element in grams per 1000 m of structural fibres), given by $Tex_{fpe} = (\% \ wt_{sf} \times \% \ wt_{fpe}) \div Tex_{sf}$.

A number of techniques exist for stitching reinforcing fibres with polymer stitching which remains in situ post compositing and curing. Specifically:

(i) tailored fibre placement (TFP) for directional strengthening involves laying up continuous reinforcing fibre in a desired direction and following with polymer stitching, in multiple layers, whereby a first line stitches a single thread or tow of structural fibre, a subsequent round stitches a superimposed thread or tow of structural fibre, a subsequent round stitches a further superimposed thread or tow etc.—this gives generally poor mechanical properties, one face of the resultant fabric having multiple round insoluble stitching;

(ii) creating folding seams with stitching whereby a line of stitching is formed along a desired fold line;

(iii) stiffening stitching, whereby cross stitching lines placed in close proximity in a thin fabric layer confer enhanced stiffness and increased planarity of the fabric;

(iv) assembly stitching in which a fabric to be oriented for example perpendicular to a second fabric is stitched in place;

(v) non crimped fabric (NCF) stitching in which cross layers of fabric are loosely stitched, to give a smooth surface—if the tension of the stitch is too high the surface loop of the stitch can however crimp the fabric in the thickness direction, moreover the stitch can be detected erroneously as a defect in non-destructive testing rendering the testing unreliable; and (vi) through the thickness (TTF) stitching through the interlaminar region of a composite with Kevlar fibre stitching which has been wrapped around with eg polyester fibre, rendering the Kevlar stitch flexible, strengthening the interlaminar region and reducing the likelihood of delamination.

In a particular advantage of the present invention all of the above known stitching methods may be provided using the soluble fibre form flexible polymer element, in conventional manner. The stitching is however adapted to dissolve on heating at the start of the cure cycle and disperse throughout the fabric, immediately followed by curing. This dispersion avoids deterioration of mechanical properties, and in most instances enhances mechanical properties by improved distribution of for example toughening polymer derived from dissolved stitching. Accordingly in a preferred embodiment the invention provides a support structure or carrier comprising the above mentioned lay up and stitching, specifically the invention provides traceless stitching.

In a further aspect of the invention there is provided a process for the preparation of a support structure or carrier as hereinbefore defined comprising providing at least one flexible polymer element, and providing reinforcing fibres as hereinbefore defined and combining in manner to provide a physical association thereof. Combining to provide a physical intimate association may be by methods as known in the art of textiles, for example by stitching, knitting, crimping, punching, (uni)weaving, braiding, overwinding, (inter)meshing, comingling, aligning, twisting, coiling, knotting, threading and the like.

A support structure or carrier may be prepared in continuous manner for example as a roll of fabric which may be tailored by stitching and weaving in desired manner, for example cross stitching to prevent fabric distortion on handling, provide folding seams, directional strengthening and the like.

Structural fibres as hereinbefore defined can be short or chopped typically of mean fibre length not more than 2 cm, for example about 6 mm. Alternatively, and preferably, the fibres are continuous and may, for example, be unidirectionally-disposed fibres or a woven fabric, i.e. the composite material comprises a prepreg. Combinations of both short and/or chopped fibres and continuous fibres may be utilised. The fibres may be sized or unsized. Reinforcing fibres can be added typically at a concentration of 5 to 35, preferably at least 20% by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7, and HTA and HTS fibres.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor. Inorganic fibre preferably is sized with a material that bonds both to the fibre and to the polymer composition; examples are the organo-silane coupling agents applied to glass fibre.

In a further aspect of the invention there is provided a curable composition comprising a flexible polymer element or a support structure or carrier as hereinbefore defined and curable resin matrix, together with optional additional reinforcing fibres, and catalysts, curing agents, additives such as fillers and the like.

A matrix resin is preferably a thermosetting resin and may be selected from the group consisting of an epoxy resin, an addition-polymerisation resin, especially a bis-maleimide resin, a formaldehyde condensate resin, especially a formaldehyde-phenol resin, a cyanate resin, an isocyanate resin, a phenolic resin and mixtures of two or more thereof, and is preferably an epoxy resin derived from the mono or polyglycidyl derivative of one or more of the group of compounds consisting of aromatic diamines, aromatic monoprimary amines, aminophenols, polyhydric phenols, polyhydric alcohols, polycarboxylic acids, cyanate ester resin, benzimidazole, polystyryl pyridine, polyimide or phenolic resin and the like, or mixtures thereof. Examples of addition-polymerisation resin are acrylics, vinyls, bis-maleimides, and unsaturated polyesters. Examples of formaldehyde condensate resins are urea, melamine and phenols.

More preferably the thermosetting matrix resin comprises at least one epoxy, cyanate ester or phenolic resin precursor, which is liquid at ambient temperature for example as disclosed in EP-A-0311349, EP-A-0365168, EP-A-91310167.1 or in PCT/GB95/01303. Preferably the thermoset is an epoxy or cyanate ester resin or a mixture thereof.

An epoxy resin may be selected from N,N,N'N'-tetraglycidyl diamino diphenylmethane (e.g. "MY 9663", "MY 720" or "MY 721" sold by Ciba-Geigy) viscosity 10–20 Pa s at 50° C.; (MY 721 is a lower viscosity version of MY 720 and is designed for higher use temperatures); N,N,N',N-tetraglycidyl-bis(4-aminophenyl)-1,4-diiso- propylbenzene (e.g. Epon 1071 sold by Shell Chemical Co.) viscosity 18–22 Poise at 110° C.; N,N,N',N'-tetraglycidyl-bis(4-amino-3,5-dimethylphenyl)-1,4-diisopropylbenzene, (e.g. Epon 1072 sold by Shell Chemical Co.) viscosity 30–40 Poise at 110° C.; triglycidyl ethers of p-aminophenol (e.g. "MY 0510" sold by Ciba-Geigy), viscosity 0.55–0.85 Pa s at 25° C.; preferably of viscosity 8–20 Pa at 25° C.; preferably this constitutes at least 25% of the epoxy components used; diglycidyl ethers of bisphenol A based materials such as 2,2-bis(4,4'-dihydroxy phenyl) propane (e.g. "DE R 661" sold by Dow, or "Epikote 828" sold by Shell), and Novolak resins preferably of viscosity 8–20 Pa s at 25° C.; glycidyl ethers of phenol Novolak resins (e.g. "DEN 431" or "DEN 438" sold by Dow), varieties in the low viscosity class of which are preferred in making compositions according to the invention; diglycidyl 1,2-phthalate, e.g. GLY CEL A-100; diglycidyl derivative of dihydroxy diphenyl methane (Bisphenol F) (e.g. "PY 306" sold by Ciba Geigy) which is in the low viscosity class. Other epoxy resin precursors include cycloaliphatics such as 3',4'-epoxycyclohexyl-3,-4-epoxycyclohexane carboxylate (e.g. "CY 179" sold by Ciba Geigy) and those in the "Bakelite" range of Union Carbide Corporation.

A cyanate ester resin may be selected from one or more compounds of the general formula NCOAr(YxArm)qOCN and oligomers and/or polycyanate esters and combinations thereof wherein Ar is a single or fused aromatic or substituted aromatics and combinations thereof and therebetween nucleus linked in the ortho, meta and/or para position and x=0 up to 2 and m and q=0 to 5 independently. The Y is a linking unit selected from the group consisting of oxygen, carbonyl, sulphur, sulphur oxides, chemical bond, aromatic linked in ortho, meta and/or para positions and/or $CR_2$ wherein $R_1$ and $R_2$ are hydrogen, halogenated alkanes, such as the fluorinated alkanes and/or substituted aromatics and/or hydrocarbon units wherein said hydrocarbon units are singularly or multiply linked and consist of up to 20 carbon atoms for each $R_1$ and/or $R_2$ and $P(R_3 R_4R'_4R_5)$ wherein $R_3$ is allyl, aryl alkoxy or hydroxy, $R'_4$ may be equal to $R_4$ and a singly linked oxygen or chemical bond and $R_5$ is doubly linked oxygen or chemical bond or $Si(R_3 R_4R'_4R_6)$ wherein $R_3$ and $R_4$, $R'_4$ are defined as in $P(R_3R_4R'_4R_5)$ above and $R_5$ is defined similar to $R_3$ above. Commercially available cyanate esters include cyanate esters of phenol/formaldehyde derived Novolaks or dicyclopentadiene derivatives thereof, an example of which is XU71787 sold by the Dow Chemical Company, and low viscosity cyanate esters such as L10 (Lonza, Ciba-Geigy, Bisphenol derived).

A phenolic resin may be selected from any aldehyde condensate resins derived from aldehydes such as methanal, ethanal, benzaldehyde or furfuraldehyde and phenols such as phenol, cresols, dihydric phenols, chlorphenols and $C_{1-9}$ alkyl phenols, such as phenol, 3- and 4-cresol(1-methyl, 3- and 4-hydroxy benzene), catechol(2-hydroxy phenol), resorcinol(1,3-dihydroxy benzene) and quinol(1,4-dihydroxy benzene). Preferably phenolic resins comprise cresol and novolak phenols.

Suitable bismaleimide resins are heat-curable resins containing the maleimido group as the reactive functionality. The term bismaleimide as used herein includes mono-, bis-, tris-, tetrakis-, and higher functional maleimides and their mixtures as well, unless otherwise noted. Bismaleimide resins with an average functionality of about two are preferred. Bismaleimide resins as thus defined are prepared by the reaction of maleic anhydride or a substituted maleic anhydride such as methylmaleic anhydride, with an aromatic or aliphatic di- or polyamine. Examples of the synthesis may be found, for example in U.S. Pat. Nos. 3,018,290, 3,018, 292, 3,627,780, 3,770,691 and 3,839,358. The closely related nadicimide resins, prepared analogously from a di- or polyamine but wherein the maleic anhydride is substituted by a Diels-Alder reaction product of maleic anhydride or a substituted maleic anhydride with a diene such as cyclopentadiene, are also useful. As used herein and in the claims, the term bismaleimide shall include the nadicimide resins.

Preferred di- or polyamine precursors include aliphatic and aromatic diamines. The aliphatic diamines may be straight chain, branched, or cyclic, and may contain heteroatoms. Many examples of such aliphatic diamines may be found in the above cited references. Especially preferred aliphatic diamines are hexanediamine, octanediamine, decanediamine, dodecanediamine, and trimethylhexanediamine.

The aromatic diamines may be mononuclear or polynuclear, and may contain fused ring systems as well. Preferred aromatic diamines are the phenylenediamines; the toluenediamines; the various methylenedianilines, particularly 4,4'-methylenedianiline; the naphthalenediamines; the various amino-terminated polyarylene oligomers corresponding to or analogues to the formula $H_2N$—Ar[X—Ar]$_n$ $NH_2$, wherein each Ar may individually be a mono- or poly-nuclear arylene radical, each X may individually be —O—, —S—, —$CO_2$, —$SO_2$—, —O—CO—, $C_1$–$C_{10}$ lower alkyl, $C_1$–$C_{10}$ halogenated alkyl, $C_2$–$C_{10}$ lower alkyleneoxy, aryleneoxy, polyoxyalkylene or polyoxyarylene, and wherein n is an integer of from about 1 to 10; and primary aminoalkyl terminated di- and polysiloxanes.

Particularly useful are bismaleimide "eutectic" resin mixtures containing several bismaleimides. Such mixtures generally have melting points which are considerably lower than the individual bismaleimides. Examples of such mixtures may be found in U.S. Pat. Nos. 4,413,107 and 4,377, 657. Several such eutectic mixtures are commercially available.

Preferably the flexible polymer element and dissolving matrix are selected as a "solution pair" providing not only dissolution at desired time and temperature, but also good matrix injection, dispersion, morphology such as phase separation and traceless dispersion if desired, and the like. Suitable solution pairs include a low viscosity matrix resin for good injection and rapid dissolution, and compatibility of matrix rein and element resin. Alternatively or additionally less compatible resins may be used if it is desired to introduce phase separation for enhanced mechanical properties. Combinations of different viscosity resins may be used each contributing various of the above properties where these are not provided by a single resin.

In the curable composition the flexible polymer element may be present as fibres in the form of a prepreg with the matrix resin in known manner, as a film in the form of an interleave with matrix film or as a porous or foamed film impregnated with matrix resin or the like.

The present invention is of particular advantage in the case that the flexible polymer element comprises in fluid phase a highly viscous polymer or a precursor thereof. The curable composition preferably comprises at least one curable thermoset matrix resin as hereinbefore defined and optionally at least one thermoplast matrix resin.

Such compositions confer enhanced beneficial properties in the end product, whereby composites may be provided to higher specification. Traditionally this may be achieved simply by incorporating additives or by increasing the quantity of a component. However it has proved problematic to increase the quantity of high viscosity resins beyond a limiting amount at which it is no longer possible to achieve a high quality blend with the additional composition components, and many properties of such resins cannot be conferred by other materials or additives. This is particularly the case with viscous thermoplastic resins, in preparing high strength low weight engineering materials.

In the case that the resin matrix includes at least one thermoplast resin, the curable composition provides elevated levels of thermoplast polymer whereby the thermoplastic resin is present in a first amount in fluid phase as a matrix component and additionally is present in a second amount in the form of at least one flexible polymer element in solid phase.

Preferably the thermoplastic resin component comprises at least one thermoplastic polymer and may be a blend of thermoplastic polymers in first or second amounts or the same or different thermoplastic polymer in first and second amount.

The thermoplastic resin component may be present in any suitable amounts. Preferably the thermoplastic resin component is present in first fluid phase amount of from 1 wt % up to that amount which it is possible to blend with the matrix resin and/or impregnate into the reinforcing fibres, preferably from 1 wt % to 15 wt %, more preferably from 5 wt % to 12.5 wt %; and is present in second solid phase amount of from 1 wt % up to any desired amount which is suitable for the desired purpose, preferably from 1 wt % to 50 wt %, more preferably from 5 wt % to 30 wt %, most preferably from 5 wt % to 20 wt %. Accordingly the composition of the invention may comprise the thermoplastic resin component in a total amount of from 2 wt % to 65 wt % of the composition.

The surprising nature of this embodiment of the present invention derives from the fact that we have found that it is possible to provide elevated levels of a thermoplastic resin component or the like in a composition by providing a part thereof in the form of a flexible polymer element such as a fibre, film or the like which is capable of dissolving in a resin matrix, whereby it may be uniformly and controllably combined in a curable composition and uniformly dispersed by means of at least partial phase transition as herein before defined to provide a polymer blend having desired properties.

It is moreover surprising that such polymer elements which we have previously found capable of undergoing phase transition in a thermosetting resin matrix are capable of undergoing phase transition in a thermoplast-containing resin matrix, specifically a thermoplast-thermoset resin matrix. It is moreover surprising that composites comprising elevated levels of a thermoplast resin component obtained in this manner exhibit enhanced properties as a result of the elevated thermoplast content.

A curing agent is suitably selected from any known thermoset curing agents, for example epoxy curing agents, as disclosed in EP-A-0 311 349, EPA 91310167.1, EP-A-0 365 168 or in PCT/GB95/01303, which are incorporated herein by reference, such as an amino compound having a molecular weight up to 500 per amino group, for example an aromatic amine or a guanidine derivative. Particular examples are 3,3'- and 4-,4'-diaminodiphenylsulphone, (available as "DDS" from commercial sources), methylenedianiline,bis(4-amino-3,5-dimethylphenyl)-1,4diisopropyl-benzene (available as EPON 1062 from Shell Chemical Co); bis(4-aminophenyl)-1,4-diisopropylbenzene (available as EPON 1061 from Shell Chemical Co); 4-chlorophenyl-N, N-dimethyl-urea, eg Monuron; 3,4-dichlorophenyl-N,N-dimethyl-urea, eg Diuron and dicyanodiamide (available as "Amicure CG 1200 from Pacific Anchor Chemical). Other standard epoxy curing agents such as aliphatic diamines, amides, carboxylic acid anhydrides, carboxylic acids and phenols can be used if desired. If a novolak phenolic resin is used as the main thermoset component a formaldehyde generator such as hexamethylenetetraamine (HMT) is typically used as a curing agent.

In a preferred embodiment of the invention the flexible polymer element comprises a polyaromatic polymer and the curable composition additionally comprises a catalyst for the polyaromatic polymer. In this case, the curing catalyst employed preferably comprises a Lewis acid having amine functionality, instead of in addition to conventional catalysts, as described in copending GB 0002145.1, the contents of which are incorporated herein by reference. Preferably the catalyst is of the formula:

$LX_n.R$

Where $LX_n$ is a Lewis acid and R is an amine. Preferably L is selected from Groups IIb, IIIb, VIII of the Periodic Table of the Elements and X is halo.

Preferred catalysts include $BF_3$, $AlF_3$, $FeF_3$, $ZnF_2$ as Lewis acid component and primary or secondary aliphatic or aromatic amine such as monoethyl amine (mea), dimethylamine (dma), benzylamine (bea) or piperidine.

In a further aspect of the invention there is provided a process for the preparation of a curable composition as hereinbefore defined as known in the art comprising contacting a flexible polymer element or a support structure or carrier as hereinbefore defined with resin matrix for example by interleaving impregnating, injecting or infusing, mixing and the like.

The composition may then be laid up with other component parts such as reinforcing fibres to provide the curable composition, or other composite parts such as metal or polymer or other bodies or structures prior to curing in known manner.

Particular applications in which the flexible polymer element of the invention as hereinbefore defined finds application are now described as non-limiting example.

Curable compositions of this present invention find utility in producing fabrics which can be composed of a combination of the polymer derived from the flexible polymer element with other resin matrix polymers, such as high molecular weight polyesters, polyamides, e.g. nylons, etc. which are used to form 'scrims' typical of the composite industry. These 'scrims' are not complete films but possess open weave structures and as such can be used to act as carriers for adhesive resin components. The combination of 'scrim' and resin components are then referred to as adhesive films. Such films can be used to bond composite structures together as well as composite to metallic structures. The flexible polymer element, such as soluble fibres, as part of the 'scrim' will dissolve as the adhesive cures and then phase separate to produce the predetermined morphology of choice. This will improve the adhesion properties of the resin to the substrate surfaces as well as increase the cohesive properties of the resin. Appropriate choice of the flexible polymer element may also lead to improvements in environmental resistance of the adhesive bond.

Another utility for these so called 'scrims' can be found as interleaves for introducing thermoplastics into the interlaminar region of conventional prepregs. The scrims can also be utilised in dry preforms where the open weave structure allows the injection/infusion of the thermosetting resins to occur throughout the preform. This is unlike the inclusion of continuous films which act as obstructions to the resin flow which in turn can lead to porosity and poor mechanical and environmental performance.

The present invention also finds utility in the area of moulding materials in which the flexible polymer element(s) can be added to a moulding compound formulation in the form of chopped fibres. The fibres are designed to remain intact, i.e. insoluble as the moulding compound travels through an injection moulding machine. This means that the viscosity of the moulding compound will in general be lower and will require lower temperatures and pressures in order to process the moulding resin. It can also mean that other additives, such as fillers and flame retardants can be added to the resin without too detrimental effect upon the moulding compound's viscosity.

Another utility for this invention is in the area of continuous resin films. Soluble fibres can be in a continuous or discontinuous form and admixed with a range of thermoset resins in order to disperse the fibres. Such film products can then be used and applied to the surface or between layers of the main structural reinforcement.

Another utility for this invention is in production of continuous films of pure polymer which can either be used as made or further modified to suit a particular application.

The soluble fibres and any reinforcing fibres used in the invention are incorporated with the resin matrix at any suitable stage in the process.

A curable composition comprising matrix resin optionally containing some volatile solvent can be contacted with the flexible element by a variety of techniques, including impregnation, injection, infusion and the like. A flexible polymer film may be foamed by solvent flashing, with subsequent impregnation to form a composite film, for example carrying an adhesive resin, or multilaminar films may be provided using known techniques.

Injection may be at ambient or elevated temperature less than the dissolution temperature as known in the art, suitably in the range room temperature to 100 C, preferably room temperature to 75 C to confer suitable resin viscosity. Injection may be in known prepreg or preform manner with use of a bag, mandrel and/or mould and optionally with use of channels or the like to assist flow as known in the art. Injection times are suitably in the range 2 to 300 minutes, preferably 2 to 120 minutes for example 2 to 30 minutes.

Preferably a fibre-reinforced composition is made by passing essentially continuous fibre into contact with such resin composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

A further procedure comprises forming incompletely cured matrix resin composition into film by for example compression moulding, extrusion, melt-casting or belt-casting, laminating such films to fibrous reinforcing agent and thermoplastic fibres in the form of for example a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158, 102159 which additionally contain thermoplastic fibres can be laminated together by heat and pressure, for example by autoclave, vacuum or compression moulding or by heated rollers, at a temperature above the curing temperature of the thermosetting resin or, if curing has already taken place, above the glass transition temperature of the mixture, conveniently at least 180° C. and typically up to 200° C., and at a pressure in particular in excess of 1 bar, preferably in the range of 1–10 bar.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. Woven fibres are an example of quasi-isotropic or intermediate between anisotropic and quasi-isotropic.

Alternatively or additionally the laminate may be single or multiply, and include directional strengthening with one or more over laid strengthening fibres, stitched in place with the soluble fibre (TFP). Laminates may be assembled in shaped manner, for example 2 fabrics may be oriented at right angles to each other to form struts and the like, and stitched in place with soluble fibre.

Preferably a curable composition provided according to the invention is a liquid moulded composition obtained by a liquid moulding method as known in the art wherein a flexible polymer element or a support structure or carrier as hereinbefore defined comprising reinforcing fibres (dry) and the at least one flexible polymer element is placed into a bag, mould or tool to provide a preform and matrix resin is injected/infused directly into the combined fibres and element.

In a further aspect of the invention there is provided a method for the curing of a curable composition comprising providing the composition as hereinbefore defined, providing additional components including other reinforcing matrix components, additives and the like, subjecting to elevated temperature for a period suitable for phase transition of flexible polymer element, and subjecting to further elevated temperature for a period suitable for gelling and/or curing of curable component, and the curing thereof to provide a cured composite.

Additional fibre reinforcement or resin matrix may be incorporated with the support structure prior to curing thereof.

The preform is preferably formed, injected/infused and cured by processing techniques such as Resin Transfer Moulding (RTM), Liquid Resin Infusion (LRI), Resin Infusion Flexible Tooling (RIFT), Vacuum Assisted Resin Transfer Moulding (VARTM), Resin Film Infusion (RFI) and the like as hereinbefore referred.

Suitably the process includes a preliminary stage of infusion of additional resin matrix at reduced pressure, followed by a degassing stage drawing off air for reducing voidage. Traditionally the degassing is carried out under elevated pressure.

In a particular advantage of the invention however we have found that degassing may be carried out at ambient or reduced pressure without void formation with use of a particular support structure or carrier configuration as hereinbefore defined wherein fibres of two different diameters are laid up in coaligned arrangement creating channels therebetween, which assists air flow. In this case the panel may be infused, degassed and cured using RIFT or VARTM techniques such as vacuum bagging, without the need for an external pressure from an autoclave to apply to the bag surface.

In this case the support structure or carrier comprises aligned soluble, and optionally additionally structural, fibres of two distinct average diameters. Suitably the support structure or carrier comprises therefore a multiaxial fabric in which fibres of a first diameter which may be soluble or structural, are laid up in colinear arrangement with fibres of greater diameter, coaligned along the first fibres, thereby creating longitudinal channels throughout the composition.

The first fibres are usually structural fibres, but optionally the embodiment of this invention comprises a support structure or carrier having soluble fibres of two diameters, whereby channels are created therebetween, some or all fibres dissolving on curing to give a composite or neat resin panel of 0% voidage.

We have suprisingly found that in the support structure or carrier of this embodiment, the fibre form flexible polymer elements remain in fibre form in the initial stages of degassing, at ambient or reduced pressure and draw air off from the panel whereafter the fibres dissolve and disperse without trace allowing the fluid phase components to compact, without external applied pressure, prior to onset of gelling and curing. If external pressure is applied the performance is simply enhanced, however it is a particular advantage that this configuration allows for the first time curing large panels without the need for an autoclave or the like.

Suitably soluble fibres are present in an amount of 2 to 50 wt %, preferably 2 to 40 wt %, more preferably 4 to 16 wt % in this embodiment. Suitably the soluble fibre is present as multifilament of Tex 30–160, laid up against structural fibre of diameter 5 to 10 micron eg 6 or 7 micron.

Additionally the configuration has advantages during the resin infusion stage, whereby channels assist in rapid and uniform infusion throughout the panel.

In a further advantage this configuration provides improved infusion with excellent control of the resin flow front.

Suitably the process of the invention comprises subjecting to elevated temperature in the range up to 300° C. for example 60 to 200 C, more preferably 75 to 150 C for a period of up to 45 minutes, preferably 0.5 to 35 minutes to effect phase transition. Temperatures in the range 100–150° C. are particularly suitable for phase transition of readily soluble flexible polymer elements for example of low MW, present in readily soluble concentration in an effective curable component solvent, and in the range 150° C. to 300° C. for less readily soluble flexible polymer elements. Suitable elevated temperature is selected in a desired range to effect phase transition in a desired time, for example a given flexible polymer element may be subjected to elevated temperature in the range 135 to 170° C. for 2–10 minutes, 125 to 135° C. for 5–30 minutes or 105 to 125° C. for 10–40 minutes.

Phase transition may be at ambient or elevated pressure corresponding to the desired injection, degassing and curing conditions.

The process includes subjecting to further elevated temperature after phase transition to cause onset of gelling or curing. Gelling may be at temperature in the range corresponding to pre cure in known manner. Gelling is preferably followed by further elevated temperature cure, or the gelled composition may be cooled for later curing, for example if gel or cure is in an autoclave, or mould, the composition may be removed from the autoclave or mould and cure continued at ambient pressure in regular oven.

Gelling or curing is suitably carried out by known means as elevated temperature and pressure for a suitable period, including temperature ramping and hold as desired. A suitable gelling or cure cycle corresponds to that for a conventional composition comprising the same component types and amounts and reference is made to the description and example illustrating calculation of amount of flexible polymer element present in the composition.

Preferably cure is at temperature in the range 180 to 400° C. for 1–4 hours, for example. Additionally the process may include post curing at suitable conditions to enhance properties such as Tg and the like.

Gelling or curing may be with use of catalysts as hereinbefore defined, whereby temperature increase causes activation, and cooling below activation temperature halts curing.

The process may be monitored in real time but preferably a suitable reaction time and temperature is predetermined for a given composition, for example by preparing samples and analysing solution and dispersion after completion of gelling or cure, for example by use of Raman spectroscopy or the like.

In a further aspect of the invention there is provided a kit of parts comprising a flexible polymer element as hereinbefore defined, a solution pair resin matrix suitable for dissolving the flexible element, and optional reinforcing fibre as a support structure or carrier or as separate components, together with any additional reinforcing fibres, matrix, monomers or polymers, curing agents and the like.

In a further aspect of the invention there is provided a cured composite or resin body comprising cured matrix resin and optional structural fibres, and dispersed cured polymer derived from soluble flexible polymer elements as hereinbefore defined, in common phase or phase separated from the matrix resin.

In a further aspect of the invention there is provided a method for selecting or blending a resin matrix suitable for assisting in dissolving a flexible polymer element as hereinbefore defined, with reference to class, molecular type, and the like. The higher the molecular weight of the polymer the greater the compatibility or solution effect needed from a solution pair resin matrix, for example polyfunctional epoxies are more effective than mono or difunctional, and phenolics more effective than cyanate esters or BMI.

In a further aspect of the invention there is provided a complex shaped structure prepared without use of a mould, comprising assembled sections in which flexible polymer element is used as hereinbefore defined as woven and/or stitching to confer mechanical properties and/or to confer planarity, fold seams, reinforcing for hinges and bolt holes, directional strengthening and the like and for assembly, and sections are assembled with use of flexible polymer element as stitching to hold the structure in place during resin injection. Particular structures which may be provided include net shape preforms and assembled panels for use in aerospace, automotive, marine, wind energy and like applications.

In a further aspect of the invention there is provided a flexible polymer element, support structure or carrier, prepreg or preform, curable composition or cured composite or resin body as hereinbefore defined for use in the preparation of an engineering composite, in aerospace, automotive, marine, wind energy, industrial application, in sporting goods and papermills, as an adhesive, functional or protective coating for example for rollers, sheet metal, electrical insulation and the like, in particular as stitched fabric for example in constructing automotive body parts, reinforced films such as monofilm, for reinforcing or filament overwinding in preparation of pipes, tanks, rollers or in reinforcing engineering structures such as bridges and the like.

The invention is now illustrated with reference to the following Figures wherein FIG. B1 (see hereinbefore) shows figuratively the Dissolution of fibre and Phase Separation;

FIG. B1a shows dissolution time for fibres at different temperatures for compositions according to the invention including different matrix epoxy resin components and different catalytic components FIG. B1b shows curves for dissolution time and gel time at different temperatures, showing a greater delta time (gel minus dissolution) at temperature of ca. 120 C. than 140 C, the delta time allows for all original tensions and residual stresses to disappear before resin gel FIGS. B2b to B2d show Raman spectra for a cured composition (of composition shown in FIG. B2a) of the invention showing uniform dispersion of dissolved fibres in epoxy resin matrix FIGS. B3a and B3b show mechanical properties of fibres FIG. B4 (see hereinbefore) shows figuratively typical two phase morphologies of thermoplast/thermoset systems;

FIG. D1 shows a woven carbon and soluble fibre configuration

FIGS. D2 to D6 and D7a to D7c show configurations of multiaxial configurations and of stitching and weaving types as hereinbefore described FIGS. E1a to E1c show dissolution of polymer fibre stitching of the invention compared with insoluble polyester stitches, in multiaxial fabrics using the same style/weight stitched with polyester and soluble fibre, in alternate layers FIGS. E2a to E2c show hybrid woven fabric of C warp vs C and soluble polymer weft and SEM pictures of the fabric at different temperatures illustrating undissolved fibre at the outset and subsequent complete dissolution of fibres in the matrix FIG. F4a shows influence of polyaromatic concentration on the dissolution time of the polyaromatic fibre in polyaromatic/epoxy composition for a fabric as shown in FIG. 2.

FIG. G2 shows processing equipment used and FIGS. G2a to G2d show panels prepared with soluble fibre co-aligned with structural fibre of lesser diameter, and processed at ambient pressure showing zero void formation by air draw off though channels created by dissimilar diameter fibre alignment, together with comparisons showing void formation in panels lacking the soluble fibre.

The invention is now illustrated in non-limiting manner with reference to the following Examples wherein Section A—Soluble Fibres for a Support Structure or Carrier

EXAMPLE A1

Preparation of Fibres

In the Examples the following polymers listed as Table I were employed for preparing flexible polymer elements of the invention:

| Polymer | Molecular Weight | End Groups |
| --- | --- | --- |
| 40:60 PES:PEES | 9,000 | Amine |
| 40:60 PES:PEES | 12,000 | Amine |
| 40:60 PES:PEES | 15,000 | Amine |
| 40:60 PES:PEES | 12,000 | Hydroxyl |

-continued

| Polymer | Molecular Weight | End Groups |
|---|---|---|
| 40:60 PES:PEES | 7,000 | Chlorine |
| 40:60 PES:PEES | 9,000 | Chlorine |
| 40:60 PES:PEES | 15,000 | Chlorine |
| 100% PES (Sumitomo 5003P) | 24,000 | Hydroxyl |

Additionally the following polymers listed as Table Comparative I were employed for preparing insoluble fibres not according to the invention:

| Polymer | Molecular weight | End Groups |
|---|---|---|
| 100% PEEK | 15,000 | Fluorine |
| Polyester PES | | |
| Polyester TRIVERA | | |

Polymers are commercially available or may be prepared as described in EP 311349, WO 99/43731, GB 000 2145.1 or GB 0020620.1 the contents of which are incorporated herein by reference.

In the following examples fibres are produced both in the laboratory and also on a commercial extruder.

EXAMPLE A2

Spinning of the Polymers Into Fibres Using a Laboratory Scale Extruder

This was carried out using a 15 cm$^3$ micro-extruder, series No 98013, as manufactured by DSM.

The polymer resins were melted using a range of temperatures and the quality of the fibres was assessed by their draw ability, aesthetic qualities and their toughness/flexibility. This property was determined initially by simply observing the ability of the fibre to be knotted without breaking. In the case of the 40:60 PES:PEES copolymers the temperature range which was studied varied from 270° C. up to 320° C.

The polymers detailed in the Table were all evaluated in this temperature range and it was found that a melt temperature of 290° C. gave the best quality fibre from the hot melt extrusion. However, this was only the case for the series of 40:60 PES:PEES copolymers. In the case of the 100% PES a minimum melt temperature of 320° C. was required. However, temperatures as high as 350° C. were required in order to reduce melt strength and be able to draw thin fibres.

EXAMPLE A3

Spinning of the Polymers Into Fibres According to the Invention Using an Industrial Scale Extruder In order for this to be successfully carried out on an industrial scale it was important that the polymer powders were converted into pellets. This was achieved using a twin screw extruder with three dies of 35 mm, a length of 1400 mm and 10 temperature zones. The following temperature profile was used:

| Zone | Temperature (C.) |
|---|---|
| Feeding 1 | Rt-100° C. |
| Extrusion 1 | |
| Extrusion 2 | increasing 250–375 |
| Extrusion 3 | |
| Extrusion 4 | |
| Extrusion n | |
| Head 1 | steady 250–375 |
| Head 2 | |
| Head 3 | |
| Head n | |

The screw speed was 230 rpm and the T melt of the polymer was 294 C. The extruded polymer was water cooled at RT and dragged into a chopper. The average diameter of the pellets was 3 mm.

The pellets were then transferred to a single screw extruder with a Die diameter of 45 mm and a length of 1.26 meters. The following temperature profile was used:

| Zone | Temperature (C.) |
|---|---|
| Extrusion 1 | |
| Extrusion 2 | increasing 250–375 |
| Extrusion 3 | |
| Extrusion n | |
| Head 1 | |
| Head 2 | steady 250–375 |
| Pump 1 | |

The temperature of the melt polymer was 295 C. Pump speed was set to give a desired Tex and desired tenacity at break. Four different Tex fibres of the invention in the range 30 to 60 Tex were obtained with different pump speeds. The minimum screw speed was set at 11 rpm and the following machine parameters were chosen to give a mono filaments fibre diameter of 30 microns:

| | |
|---|---|
| Spinning die head diameter x holes | 0.3 mm x 100 |
| Quench bath temperature | 60 C. |
| 1$^{st}$ Stretching unit speed | Not used |
| 1st orientation oven temperature | 25 C. |
| 2$^{nd}$ stretching unit speed | 200 m/min |
| 2$^{nd}$ orientation oven temperature | 25 C. |
| 3$^{rd}$ stretching unit speed | 200 m/min |
| 3$^{rd}$ oven temperature | 25 C. |
| 4$^{th}$ stretching unit speed | 200 m/min |

Fibres were pulled in air for a distance of 50 to 500 mm, according to desired modulus.

3.1 Optimisation of Drawing Temperature for Various Polymers.

In the case of the 40:60 PES:PEES Copolymers the temperature range which was studied varied from 250 C up to 375 C. The polymers detailed in Table 1 were all evaluated in this temperature range and an optimum melt temperature was selected that gave the best quality fibre from both hot melt extrusion and the melt flow indicator. The optimum melt temperature for the series of 40:60 PES:PEES copolymers was different to that for the 100% PES, for which a higher minimum melt temperature was required, and higher temperatures were required in order to reduce melt strength and be able to draw thin fibres.

EXAMPLE A4

Outlife of PES:PEES Polymers Under Hot Melt Extrusion Conditions

Samples of the amine ended 40:60 PES:PEES, 9K were studied using an RDS Rheometer with parallel plates. A sample of the polymer was heated upto 290° C. and held isothermally for over 3 hours. During this time there was very little change to the rheological properties of the resin. This was confirmed by NMR evaluation of the polymer before and after heating. The NMR showed no change to the molecular weight and number of end groups on the polymer.

Flexible polymer elements or support structures or carriers of the invention can therefore be stored at ambient or elevated temperature for extended periods up to years without dissolution, and only on contacting with solvent does the element dissolve in the order of minutes up to days.

EXAMPLE A5

Mechanical Properties of Fibres

All of the fibres studied in this programme were characterised to assess the fibres Modulus, Strength, Toughness and % Elongation. An Instron Universal Testing Machine model 5544 was used to carry out these tests. The Instron was fitted with a 5N tension/compression load cell. A gauge length of 100 mm was used for each specimen and a test speed of 50 mm/min. Measurements were made in a controlled laboratory environment, with a temperature of 23° C. and a relative humidity of 50%.

A minimum of 10–15 specimens per material were tested.

A number of properties were derived from the mechanical evaluation of the fibres these were:

1. Stiffness via Tensile Modulus
2. Strength via Maximum Tensile Stress (used to calculate D Tex)
3. Toughness via Energy to Failure
4. Displacement or % Elongation In addition, flexibility is observed. Flexibility is empirical and is inversely proportional to diameter, and is a function of modulus The following Table details the results of the mechanical behaviour of a range of thermoplastic fibres as manufactured under Example 1 (laboratory extruder).

| Polymer Fibre Type | Polymer Fibre MW/end groups | % Elongation | Maximum Stress (Mpa) | Energy to Failure/ unit area U/ mJ/mm$^3$ | Modulus (Gpa) |
|---|---|---|---|---|---|
| PES:PEES 40:60 | 7 K Chlorine ended | 27 | 42 | 929 | 1.44 |
| PES:PEES 40:60 | 15 K Chlorine ended | 48 | 171 | 5764 | 3.29 |
| PES:PEES 40:60 | 9 K Amine ended | 55 | 104 | 4451 | 5.01 |
| PES:PEES 40:60 | 12 K Amine ended | 52 | 93 | 3088 | 4.81 |
| PES:PEES 40:60 | 15 K Amine ended | 55 | 98 | 4164 | 4.3 |
| PES | 24 K OH ended | 30 | 116 | 2627 | 4.5 |

From the table it will be apparent that flexible elements may be selected by polymer type to provide desired properties for stitching, weaving, comingling or other desired support or carrier function, with reference to their inherent properties.

It should be noted that all the fibres in the above Table were produced on a laboratory extruder and as such the results should be viewed as being approximate and some results may be effected by the quality of the fibres.

EXAMPLE A6

Comparison of Other Fibre Types not According to the Invention

The following Table details the mechanical test results of alternative fibres to those based on 40:60 PES:PEES copolymers.

| Polymer Fibre | % Elongation | Maximum Stress (Mpa) | Energy to Failure/unit area U (mJ/mm$^3$) | Modulus (Gpa) |
|---|---|---|---|---|
| 100% PEEK | 116 | 110 | 8674 | 2.07 |
| Polyester (trade name PES) | 33 | 24 | — | 0.2 |
| Polyester (trade name TRIVERA) | 36 | 15 | — | 0.13 |

PES and TRIVERA are both typical examples of commercial multi-filament polyester stitch used to stitch carbon fibre fabrics. It should be noted that all other fibres studied are examples of single mono filament fibres.

Section B—Support Structure or Carrier Comprising Soluble Fibre and Dissolving Matrix Resin

EXAMPLE B1

Solubility of the Fibres in Epoxy Resin

This was carried out using a hot stage microscope. A single fibre was placed between two microscope slides and an epoxy resin was introduced. The slide was placed into the hot stage of the microscope and the material was heated from RT up to 180° C. at a rate of 2 C/min. The dissolution properties of the fibre was followed and recorded.

Study of amine ended 40:60 PES:PEES, 9K solubilised in Araldite PY306 (Ciba Geigy) epoxy resin as a function of temperature revealed that there was polymer dissolution even at temperatures as low as 90 to 100° C. As the temperature continued to rise so did the solubilising nature of the polymer fibre. Finally at 180° C. the fibre could not be seen any more and had completely dissolved.

These observations are very important as the fibre itself should not be to soluble at low injection temperatures. If they were then it is possible that as the flow front of the resin, from the injection process, proceeds from one side of the injection port to the exit port it could carry dissolved polymer fibre which would exit the LM tool. The polymer fibres solubility was in fact such that it remained dormant until the initial injection/infusion of the resin had been completed and the moulds injection/infusion and exit ports had been closed. After this the fibre then slowly dissolved as the temperature of the LM mould was increased to the final cure temperature.

At this point the polymer dissolved and entered into the reaction of the thermoset cure finally to phase separate and toughen the LM composite part.

Study of amine ended 40:60 PES:PEES, 9K solubilised in MY 0510 epoxy resin as a function of temperature revealed once again that the polymer fibre in this particular epoxy was seen to be solubilising at temperatures as low as 70 to 80° C., and in MY721 at temperatures of 110 to 120 C.

The same PES:PEES systems were investigated without DDS curing agent. There was none or negligible difference with MY epoxies, but an increase in dissolving temperature with PY epoxy.

FIG. B1 shows figuratively the dissolution process, derived from photographic images.

FIGS. B1a and B1b show time temperature curves for dissolution of fibres in epoxy resin, for different formulations, and also showing the time to dissolution and time to gel at different temperatures, indicating that very fine control of solution and of gelling onset can be provided by the present invention ensuring complete fibre dissolution before onset of gelling.

EXAMPLE B2

Dispersion of Soluble Fibre in Matrix Resin and Mechanical Testing

FIG. B2a shows the preparation of panels for mechanical testing and diffusion studies through Raman.

FIGS. B2b to B2d show Raman spectra of the cured composite. The microscope was focussed at different points on the resin block, several nm apart, just below the surface.

Using a Raman 800 μm pinhole, 633 nm laser, the microscope was focused at different points on the polished resin panel (several mm apart).

The most suitable wavenumber shift peak to identify the polysulphone polymer from the soluble fibre is at 790 cm-1: this peak shows a significant signal/noise ration with the less possible overlapping with a peak of the neat matrix resin.

In the analysis we monitored the relative intensity of the 790 cm-1 band compared with the surrounding peaks. The band remained at a very similar intensity when compared with the other features. Even in 20 different areas spectral shapes overlay very well—this confirms the dissolution and uniformity of the Soluble fibre polymer in the thermoset resin matrix.

FIG. B2d shows spectra in the 740–880 region on 20 different points and illustrates that these are very precisely superimposable, indicating uniform concentration of polysulphone at each point.

EXAMPLE B3

Mechanical Tests on Neat Resins From Soluble Fibres and Matrix Resin

Tests were conducted on several panels prepared with different level of soluble fibres.

The fracture toughness in terms of energy $G_c$ and the fracture toughness in terms of strength $K_c$ are the same The very low standard deviations in the mechanical test results (around 5%) indicate a very good diffusion of the thermoplastic modifier after dissolution The other properties measured (Modulus in flexure, yield strength in tension and Tg) are also the same FIGS. B3a and b show energy and strength fracture toughness, the results are almost identical, in each case the system with soluble fibres showing higher Gc and Kc at thermoplastic content <10% and >17%.

Compression, tension, compression after impact (CIA), in plane shear strength (IPS) were tested on panels and values were comparable with commercial panels and showed good uniformity with no delamination. Open hole tension, G1c and G2c are expected to be comparable.

EXAMPLE B4

Morphology Study

The following resin formulation containing MY0510, manufactured by Shell Chemicals, PY306, manufactured by Ciba Geigy, MDEA, manufactured by Lonza Chemicals and Chopped fibres of amine ended 40:60 PES:PEES, 9K were mixed and degassed at about 90° C. prior to being cured at 170° C. for 3 hours. Samples of the cured panels were polished and etched and examined by Scanning Electron Microscopy (SEM). The following resin formulation's were prepared using 15, 22.5 and 30% of the chopped fibres:

| Resin Component | Formulation A/ % | Formulation B/ % | Formulation C/ % |
| --- | --- | --- | --- |
| MY0510 | 25.03 | 22.08 | 20.6 |
| MY721 | | | |
| PY306 | 26.27 | 23.23 | 21.7 |
| MDEA | 24.82 | 21.9 | 20.44 |
| Amine ended 40:60 PES:PEES, 9K fibres | 15 | 22.5 | 30 |

Typical morphologies are shown in FIG. B4.

EXAMPLE B5

Solubility in Alternative Matrix Resin

Polysulphone fibre was dissolved in L10 cyanate ester having viscosity comparable to water. Injection was therefore very favorable. L10 has a higher dissolving power than epoxy because it is of lower viscosity. It is also more compatible with the polysulphone.

Fibres were found to dissolve at temperatures of 100, 110, 120, 130 and 140 C with time decreasing from 20 to 3 minutes.

The fibre was then dissolved in a blend of L10 and epoxy MY0510 to confer phase separation. The resin still injected well, cyanate ester lowering the blend viscosity, and the epoxy conferred the desired phase separation.

Section C—Support Structure or Carrier Comprising Soluble Fibre and 2 Component Resin Matrix (Thermoset and Thermoplast Polymer)

EXAMPLE C1

Morphology Study of Cured Resin

Micrographs were produced from a hot stage microscope, which follows the dissolution of a single PES:PEES fibre dispersed in a 40:60 PES:PEES/epoxy resin, the PES:PEES content was about 10 to 15%. After dissolution the field of view was adjusted to look at the bulk sample. After 30 minutes at 175° C. a noticeable particulate phase separation was observed.

Section D—Support Structure or Carrier Comprising Soluble Fibre and Structural Fibre: Configurations

EXAMPLE D1

Multiaxial Fabrics Configuration

The different uses of multiaxial fibre showing incorporation along the structural fibres and use as stitching thread are shown in FIG. D1

EXAMPLE D2

Use of Soluble Fibres as Stitching Thread in Non Crimp Fabrics

Soluble thread is stitched into carbon fibres as non crimped fabric in known manner as shown in FIG. D2. When used in a curable composition the stitches dissolve giving a smooth non-crimped finish.

EXAMPLE D3

Tailored Fibre Placement (TFP

Fibres were used as upper and lower thread, with stitching speed of around 1200 stitches/min. Fibres were placed along the structural C fibres, and were also placed around circular and rectangular cut outs etc. Configurations are shown in FIG. D3.

EXAMPLE D4

Assembly of Fabrics and Preform Construction

FIG. D4 shows a preform having several fabrics coassembled

EXAMPLE D5

Stiffening of Woven Fabrics Using Soluble Fibre

FIG. D5 shows a panel in which cross stitching is placed to stiffen a low weight 5 harness satin fabric in order to stabilise it when subjected to shear during handling.

EXAMPLE D6

Use of Soluble Fibres Stitch as Folding Seams For Preforms

FIG. D6 shows a panel which is stitched to form seams for folding in preform shaping and assembly

EXAMPLE D7

Hybrid Fabrics

FIGS. D7a to c show hybrid woven fabrics of carbon fibre with PES:PEES yarn.

Section E—Support Structure or Carrier Comprising Soluble and Structural Fibres and Matrix Resin

EXAMPLE E1

Comparison of Fibres Performance

FIGS. E1a–c show solubility of soluble PES:PEES stitching compared to polyester stitching in multiaxial fabrics. Panels were made using the same fabric style/weight stitched with polyester and PES:PEES 60 Tex fibres and alternating the layers (one with polyester stitch, one with PES:PEES stitch etc). The panels were subjected to elevated temperature of 125 C with hold for dissolution to take place.

In the figures the PES:PEES fibre has dissolved without trace but the polyester stitching is still visible.

EXAMPLE E2

Comparison or Fibres Solubility at Different Temperature

FIGS. E2a and E2b show dissolution by SEM taken through cross sections of lamina of 10 plies laid up in [0,90] configuration, each lamina being yarns or polysulphone fibre cowoven in weft direction on both sides of a C tow, injected with epoxy resin and cured with hold at different temperatures then post cured. Hold at 105 C shows incomplete dissolution whereas at 135 C the fibre is completely dissolved without visible trace.

Section F—Support Structure or Carrier Comprising Soluble and Structural Fibre and 2 Component Resin Matrix (Thermoset and Thermoplast)

EXAMPLE F1

Controlling Amount of Fibres in a Support Structure or Carrier

An amount of continuous, chopped or woven soluble fibres may be pre-weighed and laid up in desired manner with structural fibres and/or matrix according to the invention, providing a desired amount of polymer derived from the soluble fibres.

The present example illustrates calculation of fibre incorporation in the case of stitching or weaving structural fibres as hereinbefore defined, to ensure desired total amount of soluble fibre form flexible polymer element.

A curable composition comprising coweave or polysulphone fibre and structural fibre is prepared. The resultant cured composite is required to comprise 35% matrix resin comprising epoxy resin and PES:PEES resin together with 65% structural carbon fibre. These proportions are distributed in the curable composition to comprise 25% matrix resin comprising the same amount of epoxy and 10 wt % less of PES:PEES, together with 75 wt % of structural carbon and PES:PEES soluble fibre, in proportion 65:10 which corresponds to percentage 100:16.

The structural carbon is to be laid up with $Tex_{sf}$ (weight structural carbon fibre in grams of 1000 m carbon)=800.

From the formula $Tex_{fpe} = (\% \, wt_{sf} \times \% \, wt_{fpe}) \div Tex_{sf}$ $$Tex_{fpe} = 100 \times 16 \div 800 = 2$$

From this calculation the parameter (tows/cm) of the weaving machine is set to provide the desired $Tex_{fpe}$ as calculated.

EXAMPLE F2

Impregnation of Support Structure or Carrier With Curable Component

In the Examples the polymers listed in Table AI above were employed.

The epoxy or epoxies, in amount shown in Table FII were warmed, at temperature not exceeding 60° C. 40:60 PES:PEES copolymer with primary amine termination, 12K, was synthesised by reacting 1 mol of DCDPS with 2 moles of m-aminophenol using potassium carbonate as the catalyst and sulpholane as the reaction solvent. The polyaromatic, dissolved in a small amount of dichloromethane, was then added in corresponding amount shown in Table FII. Once the resins had been warmed and their viscosity reduced the solvent was removed at 60° C. The resin was used immediately or cooled for later use.

A mesh of reinforcing fibre and polysulphone fibre obtained by the method of Examples above, in respective amounts shown in Table FII was impregnated with the resin to give a total composition having the content

TABLE FII

| | RESIN | |
|---|---|---|
| PART A | Epoxies and curing agent | 17.5% |
| PART B1 | Predissolved polysulphone | 10.5% |
| | REINFORCEMENT | |
| PART B2 | Polysulphone fibres | 7% |
| PART C | Carbon | 65% |

A hybrid textile reinforcement configuration, for example woven fabric or a multiaxial fabric was used eg as illustrated in FIG. F2.

EXAMPLE F3

Infusion of Support Structure or Carrier With Curable Component

Infusion was carried out in known manner to thoroughly wet and impregnate the hybrid fabric, and using the above calculated amount of resin matrix components.

EXAMPLE F4

Cured Composite of Example F2

The composites obtained in Example F2 were subject to elevated temperature for dissolution of fibres, and on dissolution were subject to further elevated temperature for curing.

FIG. F4a shows dissolution of polysulphone fibres in the above system with different amounts of polysulphone (from 0 to 30%). The graph shows that the dissolution occurs also for high level of polysulphone. The slightly higher dissolution times for higher concentrations of polysulphone are due only to the higher viscosity.

EXAMPLE F5

Properties of the Composite of F4 Toughness

The use of 50% thermoplastic would cause a definite improvement in properties like toughness.

An increase in the level of thermoplastic leads to an improvement in toughness properties like Gc and Kc as reported in the following Table.

| Polysulphone % | Gc (kJ/m) | Kc (MPa · m$^{1/2}$) |
|---|---|---|
| 30% | 1.36 | 0.61 |
| 40% | 1.51 | 0.82 |
| 50% | 1.82 | 0.98 |

Section G—RIFT Infusion of Laminates for Infusion and Cure Under Varied Pressure or Vacuum In conventional RTM or RFI individual prepregs are stacked in a prescribed orientation to form a laminate, The laminate is laid against a smooth metal plate and covered with successive layers of porous teflon, bleeder fabric and vacuum bag. The autoclave pressure vessel provides controlled heating of a mold and laminate in a pressurized atmosphere. It applies a vacuum to the interior of the mold assemblage in order to draw off volatiles and to maintain the pressure differential between inside and outside. Commonly a flexible sheet or bag covers the uncured laminate on the mould. With a vacuum applied to the laminate and pressure applied to the outer surface of the bag, a consolidating pressure is applied to the laminate, to consolidate the individual layers, squeeze the excess resin out compress bubbles of any volatile that remain.

The pressurized atmosphere is commonly about 560 kPa–690 kpa (85 psi–100 psi). The entire operation of the autoclave is computer controlled.

VARTM simplifies hard mold RTM by employing only one-sided moulds, and using vacuum bagging techniques to compress the preform. Resin injection is driven by the 1 atm pressure difference between the mould cavity and the resin source but mould filling times can be far too long, and resin does can cure before total fill.

RIFT provides a 'distribution media', being a porous layer having very low flow resistance, provides the injected resin with a relatively easy flow path. The resin flows quickly through the distribution media, which is placed on the top of the laminate and then flows down through the thickness of the preform.

EXAMPLE G1

Method According to the Invention Using Reduced or Ambient Pressure

The method of the invention consists of using an hybrid fabric containing structural fibres (carbon, glass, aramid etc) and polysulphone multifilament having a count between 30 and 160 tex composed of single fibres having a diameter between 30 and 80 micron as shown in the FIG. G1a.

The structural fibres, for example carbon fibres, have usually diameters around 6–7 micron and are therefore smaller than the above polysulphone fibres. This difference in diameter creates artificial 'channels' that facilitate the injection and also the subsequent air removal from the laminate.

EXAMPLE G2

Samples

The following fabrics have been used to manufacture composite laminates

| Fabric | Style | Aerial weight (gsm) | Fibre in warp | Fibres in Weft |
|--------|-------|---------------------|---------------|----------------|
| A | 5HS | 370 | Carbon HTA 6k | Carbon HTA 6k |
| B | 5HS | 370 + 59 | Carbon HTA 6k | Carbon HTA 6k + soluble fibres |

The fabrics have been cut in various rectangular shapes with a size of 6×4 in and laid following the lay-up [0,90]8 to produce composite laminate using a RIFT process.

FIG. G2 shows the RIFT equipment that has been used for the example. The yellow fabric is the flow distribution media used to infuse the resin. The T connector constitutes the gate and the vent and their shape creates a stable flow front.

Both the panels were injected and cured at temperatures in the range 75 C to 180 C with suitable hold A resin with the following formulation was injected:

|  | % |
|---|---|
| PY306 | 36.86 |
| MY0510 | 35.42 |
| 44'DDS | 27.72 |

The following injection times were measured: Panel A—162s, Panel B—118s.

Therefore the injection time is lower for the panel with the soluble fibres. This shows that the fibres create channels that make the resin injection easier.

The SEM pictures of FIGS. G2a and G2b are taken from the panel A i.e. without soluble polysulphone fibres It is possible to see big voids: they are clearly evident even under visual observation.

FIGS. G2c and G2d are taken from the panel B i.e. the panel manufactured with the hybrid carbon/polysulphone fibres:

In this case, even if the panels have been cured without pressure is not possible to see any voids.

This method has clearly the additional advantage of not leaving any insoluble fibres i.e. polyester/nylon etc in the final components.

The invention claimed is:

1. A support structure comprising a flexible polymer element in combination with reinforcing fibers for use in a curable composition with a resin matrix component wherein the flexible polymer element is a mono or multi fiber or mixtures or weave thereof and is in solid phase adapted to undergo at least partial phase transition to fluid phase on contact with the resin matrix component of the curable composition in which it is soluble at a temperature which is less than the temperature for substantial onset of gelling or curing of the curable composition characterized in that the phase transition to fluid phase is by solution of the soluble polymer in the resin matrix component, wherein the matrix resin is curable and is selected from the group consisting of an epoxy resin, an addition-polymerisation resin, a bis-maleimide resin, a formaldehyde condensate resin, a formaldehyde-phenol resin, a cyanate resin, an isocyanate resin, a phenolic resin and mixtures of two or more thereof, wherein the flexible polymer element comprises at least one polyarylsulphone comprising ether-linked repeating units or thioether-linked repeating units, the units being selected from the group consisting of -(PhAPh)$_n$- and

-(Ph)$_a$- wherein A=CO or SO$_2$, Ph is phenylene, n=1 to 2 and can be fractional, a=1 to 4 and, can be fractional and when a exceeds 1, said phenylenes are linked linearly through a single chemical bond or a divalent group other than —CO— or —SO$_2$— or are fused together directly or via a cyclic moiety, such as acid alkyl group, a (hetero) aromatic or cyclic ketone, amide, imide, imine.

2. Support structure as claimed in claim 1 wherein the flexible polymer element further comprises liquid rubbers having reactive groups, aggregates, metal particles, filler, pigments, nucleating agents, stabilisers, agents for increased solvent resistance, flame retardants, crystalline polymers, binder, adhesives, or coating agents.

3. Support structure as claimed in claim 1 wherein the units of the at least one polyarylsulphone are:

X Ph SO$_2$Ph X Ph SO$_2$Ph("PES") and    (I)

X(Ph)$_a$ X Ph SO$_2$Ph("PEES")    (II)

where X is O or S and may differ from unit to unit; the ratio is I to II ratio is between 10:90 and 80:20.

4. Support structure as claimed in claim 1 wherein the number average molecular weight of the polyarylsulphone is in the range 2000 to 25000.

5. Support structure as claimed in claim 1 wherein the polyarylsulphone contains pendant or chain-terminating groups selected from OH, NH$_2$, NHR' or —SH, where R' is a hydrocarbon group containing up to 8 carbon atoms, epoxy, (meth)acrylate, cyanate, isocyanate, acetylene or ethylene, as in vinyl allyl or maleimide, anhydride, oxazaline and monomers containing saturation.

6. Support structure as in claim 1 wherein the reinforcing fibers and the mono or multi filament fibers comprise a fabric, web, weave, non woven, overwinding, preform, scrim, mesh, fleece, roving, prepreg, composite laminar film, interleave or a mixture thereof or is stitched, sewn, or threaded.

7. Support structure as in claim 1 wherein the reinforcing fibres are insoluble fibers, selected from the group consisting of organic polymer, inorganic polymer, carbon, glass, inorganic oxide, carbide, ceramic, and metal fibers.

8. Support structure as in claim 1 wherein reinforcing fibres are laid up in a desired arrangement and the flexible polymer element is in the form of stitching, securing the reinforcing fibers arrangement, adapted to undergo phase transition in manner to disperse locally or universally in the curable composition and to provide at least partially traceless soluble stitching.

9. Support structure as claimed in claim 8 wherein desired arrangement is selected from the group consisting of random, mono or multiaxial, (co) linear or (co) planar.

10. Support structure as in claim 8 wherein the soluble stitching is selected from tailored fibers placement (TFP) for directional strengthening, stitching formed along a desired fold line, stiffening stitching, assembly stitching, non crimped fabric (NCF) stitching, and through the thickness (TTF) stitching.

11. Process for the preparation of a support structure as in claim 8 comprising providing at least one flexible polymer element, and providing reinforcing fibers and combining by stitching, knitting, crimping, punching, uniweaving, braiding, overwinding, intermeshing, comingling, aligning, twisting, coiling, knotting, and threading.

12. Curable composition comprising a support structure of claim 1 and a resin matrix component, together with catalysts, curing agents, and additives such as fillers.

13. Curable composition as in claim 12 wherein a thermoplastic resin is present in a first amount in fluid phase as a resin matrix component and additionally is present in a second amount in the form of the at least one flexible polymer element in solid phase.

14. Process for the preparation of a curable composition as in claim 12 comprising contacting the support structure with the resin matrix component by impregnating, injecting or infusing, and mixing.

15. Process as in claim 14 wherein injection is at ambient or elevated temperature less than the dissolution temperature.

16. Method for the preparation of a composite comprising providing a curable composition as in claim 12, subjecting to elevated temperature for a period suitable for phase transition by solution of the flexible polymer element, and subjecting to further elevated temperature for a period suitable for gelling and/or curing of the resin matrix.

17. Method as in claim 16 further comprising a degassing stage which is carried out at ambient or reduced pressure.

18. Method as in claim 16 which further comprises subjecting to elevated temperature in the range 100–300° C. for a period of up to 45 minutes, to effect phase transition by solution.

19. Method as in claim 16 wherein the gelling and/or curina is at a temperature in the range 100 to 175° C., and a post-cure is at a temperature in the range 180 to 400° C. for 1–4 hours.

20. The support structure as claimed in claim 1 for use in preparing a composite for aerospace use.

21. Support structure as claimed in claim 1 wherein the flexible polymer element has a low molecular weight adapted to react on curing to provide a higher molecular weight for toughening.

* * * * *